US011548326B2

(12) United States Patent  (10) Patent No.: US 11,548,326 B2
Tauchi  (45) Date of Patent: Jan. 10, 2023

(54) PNEUMATIC TIRE

(71) Applicant: The Yokohama Rubber Co., LTD., Tokyo (JP)

(72) Inventor: Risa Tauchi, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 250 days.

(21) Appl. No.: 17/044,858

(22) PCT Filed: Apr. 3, 2019

(86) PCT No.: PCT/JP2019/014891
§ 371 (c)(1),
(2) Date: Oct. 1, 2020

(87) PCT Pub. No.: WO2019/194257
PCT Pub. Date: Oct. 10, 2019

(65) Prior Publication Data
US 2021/0107321 A1    Apr. 15, 2021

(30) Foreign Application Priority Data

Apr. 4, 2018 (JP) .............................. JP2018-072697

(51) Int. Cl.
*B60C 15/06* (2006.01)
*B60C 15/024* (2006.01)
*B60C 15/04* (2006.01)

(52) U.S. Cl.
CPC ............ *B60C 15/024* (2013.01); *B60C 15/06* (2013.01); *B60C 15/04* (2013.01); *B60C 2015/0614* (2013.01)

(58) Field of Classification Search
CPC .................................................. B60C 15/024
See application file for complete search history.

(56) References Cited

U.S. PATENT DOCUMENTS 5,769,981 A     6/1998  Turley et al.
6,276,417 B1 *  8/2001  Honbo ................. B60C 15/024
                                               152/544
(Continued)

FOREIGN PATENT DOCUMENTS

CN    106585291       4/2017
CN    106585291 A  *  4/2017  ........... B60B 21/102
(Continued)

OTHER PUBLICATIONS

Machine Translation: JP-2000118210-A; Yanagisawa M; (Year: 2022).*

(Continued)

*Primary Examiner* — Kendra Ly
(74) *Attorney, Agent, or Firm* — Thorpe North & Western

(57) ABSTRACT

A pneumatic tire is mounted on a 5° rim. A bead core includes a bottom inclined 0°-5° in a direction in which the bottom diverges outward in the radial direction as the bottom extends from an inner side toward an outer side in the width direction. A bead includes a base, a toe, a heel, and a back surface. The heel connects to the back surface by an arc. The base includes a region between a core lower inner end position on an inner circumferential surface of the bead and being identical to a position of a bead core inner end and a core lower outer end position on an inner circumferential surface of the bead and being identical to a position of a bead core outer end in the width direction. The base has a curved line projecting toward the inner side in the radial direction in a cross-section.

11 Claims, 8 Drawing Sheets

(56) References Cited

U.S. PATENT DOCUMENTS

| | | | |
|---|---|---|---|
| 2006/0189237 A1* | 8/2006 | Obora | B60C 9/0042 |
| | | | 442/208 |
| 2006/0272761 A1 | 12/2006 | Nakamura | |
| 2006/0289103 A1* | 12/2006 | Suzuki | B60C 15/024 |
| | | | 152/544 |
| 2010/0089513 A1 | 4/2010 | Sasaki | |
| 2010/0175801 A1 | 7/2010 | Mani | |
| 2012/0097310 A1 | 4/2012 | Potier | |
| 2016/0039522 A1 | 2/2016 | Rubber | |

FOREIGN PATENT DOCUMENTS

| | | | |
|---|---|---|---|
| CN | 106739843 | | 5/2017 |
| JP | 09109624 A | * | 4/1997 |
| JP | H09-164821 | | 6/1997 |
| JP | H09-188105 | | 7/1997 |
| JP | 10230715 A | * | 9/1998 |
| JP | H10-230715 | | 9/1998 |
| JP | H11-208224 | | 8/1999 |
| JP | 2000-062418 | | 2/2000 |
| JP | 2000118210 A | * | 4/2000 |
| JP | 2000198327 A | * | 7/2000 |
| JP | 2003320805 A | * | 11/2003 |
| JP | 2005193750 A | * | 7/2005 |
| JP | 2005193868 A | * | 7/2005 |
| JP | 2006224934 A | * | 8/2006 |
| JP | 2011235783 A | * | 11/2011 |
| JP | 4934241 | | 5/2012 |
| JP | 2012-519111 | | 8/2012 |
| JP | 5629275 | | 11/2014 |
| JP | 2017-065330 | | 4/2017 |
| WO | WO 00/06399 | | 2/2000 |
| WO | WO 2005/025897 | | 3/2005 |
| WO | WO 2007/015341 | | 2/2007 |
| WO | WO 2010/100102 | | 9/2010 |
| WO | WO 2014/141701 | | 9/2014 |

OTHER PUBLICATIONS

Machine Translation: JP-09109624-A; Io M; (Year: 2022).*
Machine Translation: JP-2005193868-A; Yugawa N; (Year: 2022).*
Machine Translation: JP-2000198327-A; Sakuno H; (Year: 2022).*
Machine Translation: JP-2005193750-A; Hirokawa Y; (Year: 2022).*
Machine Translation: JP-2006224934-A; Watanabe T; (Year: 2022).*
Machine Translation: JP-10230715-A; Iwata T; (Year: 2022).*
Machine Translation: CN-106585291-A; Chen X; (Year: 2022).*
Machine Translation: JP-2011235783-A; Koyama T; (Year: 2022).*
Machine Translation: JP-2003320805-A; Hirose K; (Year: 2022).*
International Search Report for International Application No. PCT/JP2019/014891 dated Jun. 25, 2019, 4 pages, Japan.

* cited by examiner

|  | CONVENTIONAL EXAMPLE | COMPARATIVE EXAMPLE | EXAMPLE 1 | EXAMPLE 2 | EXAMPLE 3 | EXAMPLE 4 |
|---|---|---|---|---|---|---|
| SHAPE OF BEAD BASE PORTION | FLAT STRAIGHT LINE | FLAT STRAIGHT LINE | CURVED LINE PROJECTING TOWARD INNER DIAMETER SIDE | CURVED LINE PROJECTING TOWARD INNER DIAMETER SIDE | CURVED LINE PROJECTING TOWARD INNER DIAMETER SIDE | CURVED LINE PROJECTING TOWARD INNER DIAMETER SIDE |
| PRESENCE, WITHIN RANGE BETWEEN BACK SURFACE PORTION AND CORE LOWER OUTER END PORTION POSITION Q, OF PORTION WHERE ((RIM DIAMETER − TIRE INNER DIAMETER)/RIM DIAMETER × 100) IS 0% | NO | NO | NO | YES | YES | YES |
| DIFFERENCE IN ((RIM DIAMETER − TIRE INNER DIAMETER)/RIM DIAMETER × 100) BETWEEN CORE BOTTOM OUTER END PORTION LOWER POSITION P AND CORE LOWER OUTER END PORTION POSITION Q | 0.1% | 0.1% | 0.1% | 0.1% | 0.3% | 0.3% |
| (RIM DIAMETER DQR − TIRE INNER DIAMETER DQ)/RIM DIAMETER DQR × 100 | 1.5% | 1.1% | 1.5% | 1.5% | 1.4% | 1.4% |
| (RIM DIAMETER DPR − TIRE INNER DIAMETER DP)/RIM DIAMETER DPR × 100 | 1.6% | 1.2% | 1.6% | 1.6% | 1.7% | 1.7% |
| COMPRESSION RATIO Z OF RUBBER LOCATED ON INNER SIDE OF BEAD CORE IN TIRE RADIAL DIRECTION | 35% | 35% | 40% | 40% | 40% | 60% |
| IS CONNECTION PORTION BETWEEN ARC PORTION AND BACK SURFACE PORTION LOCATED WITHIN RANGE BETWEEN MAXIMUM WIDTH POSITION OF BEAD CORE AND POSITION OF BEAD CORE BOTTOM? | OUT OF RANGE | OUT OF RANGE | OUT OF RANGE | OUT OF RANGE | OUT OF RANGE | OUT OF RANGE |
| POSITION OF TOE SIDE BENT PORTION IN TIRE WIDTH DIRECTION WITH RESPECT TO INNER END PORTION OF BEAD CORE | OUTER SIDE | OUTER SIDE | OUTER SIDE | OUTER SIDE | OUTER SIDE | OUTER SIDE |
| MAXIMUM WIDTH CW OF BEAD CORE/BEAD WIDTH BW | 53% | 55% | 55% | 55% | 55% | 55% |
| BEAD WIDTH BW | 65 mm | 69 mm | 69 mm | 69 mm | 69 mm | 69 mm |
| MAXIMUM WIDTH CW OF BEAD CORE/HEIGHT CH OF BEAD CORE | 1.9 | 1.4 | 1.4 | 1.4 | 1.4 | 1.4 |
| DISTANCE BD1 FROM BEAD CORE BOTTOM CENTER TO SURFACE OF CARCASS CORD | 4 mm | 2.5 mm | 2.5 mm | 2.5 mm | 2.5 mm | 2.5 mm |
| RIM SLIP RESISTANCE | 100 | 70 | 105 | 105 | 106 | 112 |
| MOUNTABILITY ON RIMS | 100 | 105 | 102 | 105 | 106 | 103 |
| BEAD DURABILITY | 100 | 90 | 103 | 103 | 103 | 103 |

FIG. 6A

| SHAPE OF BEAD BASE PORTION | EXAMPLE 5 CURVED LINE PROJECTING TOWARD INNER DIAMETER SIDE | EXAMPLE 6 CURVED LINE PROJECTING TOWARD INNER DIAMETER SIDE | EXAMPLE 7 CURVED LINE PROJECTING TOWARD INNER DIAMETER SIDE | EXAMPLE 8 CURVED LINE PROJECTING TOWARD INNER DIAMETER SIDE | EXAMPLE 9 CURVED LINE PROJECTING TOWARD INNER DIAMETER SIDE | EXAMPLE 10 CURVED LINE PROJECTING TOWARD INNER DIAMETER SIDE |
|---|---|---|---|---|---|---|
| PRESENCE, WITHIN RANGE, BETWEEN BACK SURFACE PORTION AND CORE LOWER OUTER END PORTION POSITION Q, OF PORTION WHERE ((RIM DIAMETER - TIRE INNER DIAMETER)/RIM DIAMETER × 100) IS 0% | YES | YES | YES | YES | YES | YES |
| DIFFERENCE IN ((RIM DIAMETER - TIRE INNER DIAMETER)/RIM DIAMETER × 100) BETWEEN CORE BOTTOM OUTER END PORTION LOWER POSITION P AND CORE LOWER OUTER END PORTION POSITION Q | 0.3% | 0.5% | 0.5% | 0.5% | 0.5% | 0.5% |
| (RIM DIAMETER DQ - TIRE INNER DIAMETER DQR)/RIM DIAMETER DQR × 100 | 1.4% | 1.3% | 1.3% | 1.3% | 1.3% | 1.3% |
| (RIM DIAMETER DP - TIRE INNER DIAMETER DPR)/RIM DIAMETER DPR × 100 | 1.7% | 1.8% | 1.8% | 1.8% | 1.8% | 1.8% |
| COMPRESSION RATIO Z OF RUBBER LOCATED ON INNER SIDE OF BEAD CORE IN TIRE RADIAL DIRECTION | 45% | 50% | 50% | 50% | 50% | 50% |
| IS CONNECTION PORTION BETWEEN ARC PORTION AND BACK SURFACE PORTION LOCATED WITHIN RANGE BETWEEN MAXIMUM WIDTH POSITION OF BEAD CORE AND POSITION OF BEAD CORE BOTTOM? | OUT OF RANGE | OUT OF RANGE | WITHIN RANGE | WITHIN RANGE | WITHIN RANGE | WITHIN RANGE |
| POSITION OF TOE SIDE BENT PORTION IN TIRE WIDTH DIRECTION WITH RESPECT TO INNER END PORTION OF BEAD CORE | OUTER SIDE | OUTER SIDE | OUTER SIDE | INNER SIDE | INNER SIDE | INNER SIDE |
| MAXIMUM WIDTH CW OF BEAD CORE/BEAD WIDTH BW | 55% | 55% | 55% | 53% | 59% | 55% |
| BEAD WIDTH BW | 69 mm | 69 mm | 69 mm | 69 mm | 69 mm | 65 mm |
| MAXIMUM WIDTH CW OF BEAD CORE/HEIGHT CH OF BEAD CORE | 1.4 | 1.4 | 1.4 | 1.4 | 1.4 | 1.4 |
| DISTANCE BD1 FROM BEAD CORE BOTTOM CENTER TO SURFACE OF CARCASS CORD | 2.5 mm | 2.5 mm | 2.5 mm | 2.5 mm | 2.5 mm | 2.5 mm |
| RIM SLIP RESISTANCE | 110 | 115 | 116 | 118 | 121 | 119 |
| MOUNTABILITY ON RIMS | 105 | 105 | 106 | 106 | 106 | 106 |
| BEAD DURABILITY | 103 | 103 | 103 | 103 | 102 | 103 |

FIG. 6B

| SHAPE OF BEAD BASE PORTION | EXAMPLE 11 CURVED LINE PROJECTING TOWARD INNER DIAMETER SIDE | EXAMPLE 12 CURVED LINE PROJECTING TOWARD INNER DIAMETER SIDE | EXAMPLE 13 CURVED LINE PROJECTING TOWARD INNER DIAMETER SIDE | EXAMPLE 14 CURVED LINE PROJECTING TOWARD INNER DIAMETER SIDE | EXAMPLE 15 CURVED LINE PROJECTING TOWARD INNER DIAMETER SIDE | EXAMPLE 16 CURVED LINE PROJECTING TOWARD INNER DIAMETER SIDE |
|---|---|---|---|---|---|---|
| PRESENCE, WITHIN RANGE BETWEEN BACK SURFACE PORTION AND CORE LOWER OUTER END PORTION POSITION Q, OF PORTION WHERE ((RIM DIAMETER - TIRE INNER DIAMETER)/RIM DIAMETER × 100) IS 0% | YES | YES | YES | YES | YES | YES |
| DIFFERENCE IN ((RIM DIAMETER - TIRE INNER DIAMETER)/RIM DIAMETER × 100) BETWEEN CORE BOTTOM OUTER END PORTION LOWER POSITION P AND CORE LOWER OUTER END PORTION POSITION Q | 0.5% | 0.5% | 0.5% | 0.5% | 0.5% | 0.5% |
| (RIM DIAMETER DQR - TIRE INNER DIAMETER DQR)/RIM DIAMETER DQR × 100 | 1.3% | 1.3% | 1.3% | 1.3% | 1.3% | 1.3% |
| (RIM DIAMETER DPR - TIRE INNER DIAMETER DPR)/RIM DIAMETER DPR × 100 | 1.8% | 1.8% | 1.8% | 1.8% | 1.8% | 1.8% |
| COMPRESSION RATIO Z OF RUBBER LOCATED ON INNER SIDE OF BEAD CORE IN TIRE RADIAL DIRECTION | 50% | 50% | 50% | 50% | 50% | 50% |
| IS CONNECTION PORTION BETWEEN ARC PORTION AND BACK SURFACE PORTION LOCATED WITHIN RANGE BETWEEN MAXIMUM WIDTH POSITION OF BEAD CORE AND POSITION OF BEAD CORE BOTTOM? | WITHIN RANGE | WITHIN RANGE | WITHIN RANGE | WITHIN RANGE | WITHIN RANGE | WITHIN RANGE |
| POSITION OF TOE SIDE BENT PORTION IN TIRE WIDTH DIRECTION WITH RESPECT TO INNER END PORTION OF BEAD CORE | INNER SIDE | INNER SIDE | INNER SIDE | INNER SIDE | INNER SIDE | INNER SIDE |
| MAXIMUM WIDTH CW OF BEAD CORE/BEAD WIDTH BW | 55% | 55% | 55% | 55% | 55% | 55% |
| BEAD WIDTH BW | 75 mm | 69 mm | 69 mm | 69 mm | 69 mm | 69 mm |
| MAXIMUM WIDTH CW OF BEAD CORE/HEIGHT CH OF BEAD CORE | 1.4 | 0.9 | 1.5 | 1.4 | 1.4 | 1.4 |
| DISTANCE BD1 FROM BEAD CORE BOTTOM CENTER TO SURFACE OF CARCASS CORD | 2.5 mm | 2.5 mm | 2.5 mm | 1.9 mm | 3.6 mm | 2.5 mm |
| RIM SLIP RESISTANCE | 123 | 115 | 122 | 120 | 120 | 121 |
| MOUNTABILITY ON RIMS | 106 | 106 | 106 | 106 | 106 | 106 |
| BEAD DURABILITY | 101 | 103 | 102 | 102 | 101 | 104 |

FIG. 6C

PNEUMATIC TIRE

FIELD OF THE TECHNOLOGY

The present technology relates to a pneumatic tire.

BACKGROUND OF THE TECHNOLOGY

A pneumatic tire is mounted on a rim wheel by fitting, to a rim of a rim wheel, a bead portion with a bead core corresponding to an annular member including a plurality of bead wires bundled. The bead portion is a portion that is actually mounted on the rim wheel in a case where the pneumatic tire is mounted on the rim wheel, and thus, in some known pneumatic tires, various improvements are made to the bead portions to achieve desired performance.

For example, in the pneumatic tire described in Japan Patent No. 5629275, the bead cores are shaped to be wider in the tire width direction to reduce localized pressure, suppressing damage to the rim. Additionally, in the tire described in Japan Patent No. 5629275, a bead heel portion of the bead base portion in a meridian cross-section has a round contour with a large radius of curvature, thus ensuring easiness of mounting on the rim. Additionally, in a heavy duty pneumatic radial tire described in Japan Patent No. 4934241, a predetermined range is set for the ratio, to the volume of rubber chafer displaced and deformed by a rim bead sheet, of a space in which rubber chafer displaced and deformed due to mounting, is received, the space being located in a corner where the rim bead sheet is continuous with a rim flange. This configuration prevents separation of the rubber chafer.

Here, pneumatic tires are mounted on various types of vehicles, and in construction vehicles, corresponding to a type of such vehicles, a large torque may be transmitted to the wheels during construction operations. For example, in a wheel loader, which is an example of a construction vehicle, in a case where a bucket provided at a front end of the vehicle is used to scoop up the earth and sand and the like, a large load acts on the front wheels, and thus traveling in this state causes the large torque to be transmitted to the front wheels. In recent years, in this type of wheel loader, high horsepower has been achieved, leading to a tendency toward an increase in torque transmitted to the wheels, and thus the wheels are often used under stringent conditions. Thus, in the wheels mounted on the construction vehicle such as a wheel loader, so-called rim slippage, corresponding to slippage between the rim and the bead portion, may occur due to the increased horsepower of the vehicle. In other words, the torque transmitted to the wheels is transmitted from the rim wheel to the pneumatic tire via the bead portion, and an excessively high torque transmitted from the rim wheel to the bead portion may cause slippage between the rim and the bead portion. The rim slippage thus occurring between the rim wheel and the pneumatic tire may wear rubber in a bead base portion corresponding to an inner circumferential surface of the bead portion and coming into contact with the rim, leading to damage to the bead base portion.

A possible cause of such rim slippage is an insufficient fastening force exerted on the rim by the bead portion. A possible method for increasing the fastening force of the bead portion is to reduce the inner diameter of the bead core of the bead portion or to reduce the circumferential length of the bead heel portion of the bead base portion. However, the reduced inner diameter of the bead core or the reduced circumferential length of the bead heel portion increases the fastening force of the bead portion, but may degrade mountability of the pneumatic tire on the rim in a case of mounting on the rim wheel. The degraded mountability on the rim may cause an eccentric fitting in which the bead portions are fitted eccentrically to the rim wheel, defective seating of the bead portion on the rim wheel, or the like, leading to a reduced fastening force.

Additionally, in a case where the pneumatic tire is mounted on the rim wheel, the contact pressure exerted on the rim by the bead portion is often not uniform, and the increased fastening force of the bead portion may locally excessively increase the contact pressure in portions where the contact pressure is originally large. In this case, the excessively increased contact pressure exerted on the rim by the bead portion may damage the bead portion. However, in a case where the inner diameter of the bead core or the circumferential length of the bead heel portion is set in order to emphasize the mountability on the rim or to ensure durability of the bead portion, the fastening force exerted on the rim by the bead portion may be insufficient, leading to the likelihood of rim slippage. As described above, suppressing rim slippage without degrading the mountability on the rim or bead durability has been very difficult.

SUMMARY

A pneumatic tire according to an embodiment of the present technology includes a pair of bead portions disposed on both sides of a tire equatorial plane in a tire width direction, and a bead core provided on each of the pair of bead portions, the pneumatic tire is mounted on a 5°-taper specified rim, the bead core is shaped like a hexagon in a tire meridian cross-section and includes a bead core bottom corresponding to an inner circumferential surface of the bead core and inclined within a range of 0° or larger and 5° or smaller with respect to a tire rotation axis in a direction in which the bead core bottom diverges outward in a tire radial direction from an inner side in a tire width direction toward an outer side in the tire width direction, the bead portion includes a bead base portion formed on an inner circumferential surface of the bead portion, a toe portion located on an inner side of the bead base portion in the tire width direction, a heel portion located on an outer side of the bead base portion in the tire width direction, and a back surface portion located on an outer side of the heel portion in the tire radial direction and facing an outer side in the tire width direction, the heel portion is connected to the back surface portion through an arc portion formed like an arc in the tire meridian cross-section, the bead base portion includes a region between a core lower inner end portion position located on an inner circumferential surface and being identical to a position in the tire width direction of a tire width direction inner end portion of the bead core and a core lower outer end portion position where the position located on an inner circumferential surface and being identical to a position in the tire width direction of a tire width direction outer end portion of the bead core, and the bead base portion has a curved line projecting toward an inner side in the tire radial direction in the tire meridian cross-section.

In the pneumatic tire described above, preferably, the range between the core lower inner end portion position and the core lower outer end portion position in the bead base portion is formed into a curved line projecting toward the inner side in the tire radial direction in the tire meridian cross-section.

In the pneumatic tire described above, preferably, the toe portion includes a straight line in the tire meridian cross-section and projects inward from the bead base portion in the tire radial direction.

In the pneumatic tire described above, preferably, in the bead base portion, a position of an outermost projection portion separated farthest from a straight line connecting the core lower inner end portion position and the core lower outer end portion position in the tire meridian cross-section is located between a position in the tire width direction of a center of the bead core bottom in the tire width direction and a position in the tire width direction of a tire width direction outer end portion of the bead core bottom.

In the pneumatic tire described above, preferably, the bead portion includes, within a range between a position of the heel portion connected to the back surface portion and the core lower outer end portion position, a portion in which a relationship between a diameter Dn of the inner circumferential surface of the bead portions with the identical position in the tire width direction and a diameter DnR of the specified rim is represented by a calculation (DnR−Dn)/DnR×100 being 0%.

In the pneumatic tire described above, preferably, assuming that, for the bead base portion, DP is a diameter at a core bottom outer end portion lower position where the position in the tire width direction is identical to the position in the tire width direction of the tire width direction outer end portion of the bead core bottom, DQ is a diameter at the core lower outer end portion position, DPR is a diameter at a position on the specified rim corresponding to the core bottom outer end portion lower position, and DQR is a diameter at a position on the specified rim corresponding to the core lower inner end portion position, (DPR−DP)/DPR×100 is at least 0.2% larger than (DQR−DQ)/DQR×100.

In the pneumatic tire described above, preferably, in a case where the pneumatic tire is mounted on the specified rim, a compression ratio of rubber located on an inner side of the bead core in the tire radial direction is within a range of 45% or more and 55% or less at a position on an inner side, in the tire radial direction, of the center of the bead core bottom of the center of the bead core bottom in the tire meridian cross-section.

In the pneumatic tire described above, preferably, a connection portion corresponding to a portion where the arc portion and the back surface portion are connected is located within a range in the tire radial direction between a position in the tire radial direction corresponding to a maximum width portion of the bead core in the meridian cross-section and the position of the bead core bottom in the tire radial direction.

In the pneumatic tire described above, preferably, the toe portion projects inward from the bead base portion in the tire radial direction, and the bead base portion and the toe portion are connected through a toe side bent portion bent toward the outer side in the tire radial direction, and a position of the toe side bent portion in the tire width direction is located on an inner side of the core lower inner end portion position in the tire width direction.

In the pneumatic tire described above, preferably, assuming that BW is a distance between a tire inner surface and a tire outer surface on a straight line parallel to a straight line extending through a center of the bead core in the tire meridian cross-section and connecting the core lower inner end portion position and the core lower outer end portion position, the bead core has a maximum width CW in the tire meridian cross-section in a range of (BW×0.54)≤CW≤(BW×0.58).

In the pneumatic tire described above, preferably, the bead width BW is within a range of (0.265x+20.5) mm≤BW≤(0.265x+26.5) mm with respect to a specified load x kN.

In the pneumatic tire described above, the bead core has a relationship between a maximum width CW in the tire meridian cross-section and a height CH in the tire radial direction, the relationship preferably being within a range of 1.0≤(CW/CH)<1.5.

The pneumatic tire described above further includes a reinforcing layer disposed extending through the inner side of the bead core in the tire width direction of the bead core and between the inner side and the outer side of the bead core in the tire width direction of the bead core, and the reinforcing layer includes a cord member covered with a rubber member, the bead portion has a distance of 2.0 mm or more and 3.5 mm or less in the tire radial direction from a center of the bead core bottom in a tire meridian cross section to a surface of the cord member of a portion of the reinforcing layer located on an inner side in the tire radial direction.

The pneumatic tire according to an embodiment of the present technology is effective in allowing suppression of rim slippage while ensuring mountability on rims and bead durability.

BRIEF DESCRIPTION OF THE DRAWINGS

FIG. 6A is a table indicating the results of performance evaluation tests of pneumatic tires.

FIG. 6B is a table indicating the results of the performance evaluation tests of the pneumatic tires.

FIG. 6C is a table indicating the results of the performance evaluation tests of the pneumatic tires.

DETAILED DESCRIPTION

Pneumatic tires according to embodiments of the present technology are described in detail below with reference to the drawings. However, the present technology is not limited by the embodiments. Constituents of the following embodiments include elements that are essentially identical or that can be substituted or easily conceived by one skilled in the art.

Herein, "tire radial direction" refers to the direction orthogonal to the rotation axis (not illustrated) of a pneumatic tire 1. "Inner side in the tire radial direction" refers to the direction toward the rotation axis in the tire radial direction. "Outer side in the tire radial direction" refers to the direction away from the rotation axis in the tire radial direction. Additionally, "Tire circumferential direction" refers to the circumferential direction with the rotation axis as the center axis. Additionally, "tire width direction" refers to a direction parallel with the rotation axis. "Inner side in the tire width direction" refers to a side toward a tire equatorial plane (tire equator line) CL in the tire width direction. "Outer side in the tire width direction" refers to a side away from the tire equatorial plane CL in the tire width direction. "Tire equatorial plane CL" refers to a plane orthogonal to the tire rotation axis and extending through the center of the tire width of the pneumatic tire 1. The tire equatorial plane CL is aligned, in the tire width direction, with a tire width direction center line corresponding to the center position of the pneumatic tire 1 in the tire width direction. "Tire width" is the width in the tire width direction between positions located outermost in the tire width direction, or in other words, the distance between the portions that are the most distant from the tire equatorial plane CL in the tire width direction. "Tire equator line" refers to the line in the tire circumferential direction of the pneumatic tire 1 that lies on the tire equatorial plane CL. "Tire meridian cross section" hereinafter refers to a cross-section of the tire taken along a plane that includes a tire rotation axis.

Figure 1:
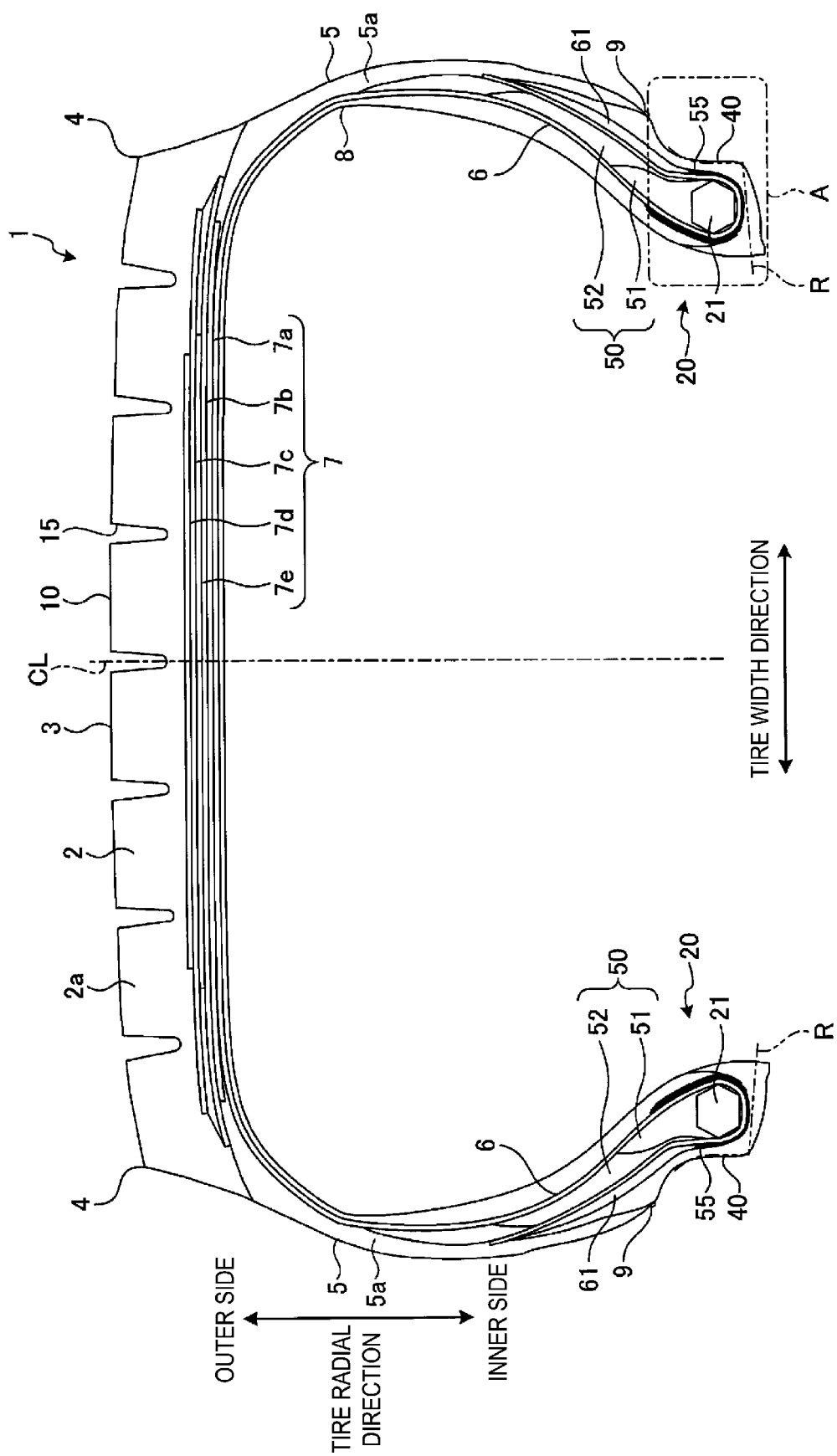
FIG. 1 is a meridian cross-sectional view illustrating a main portion of a pneumatic tire according to an embodiment.

FIG. 1 is a meridian cross-sectional view illustrating a main portion of a pneumatic tire 1 according to an embodiment. The pneumatic tire 1 according to the embodiment is a radial tire for a construction vehicle referred to as an off the road tire (OR tire). The pneumatic tire 1, illustrated in FIG. 1 as the present embodiment, is provided with a tread portion 2 in an outermost projection portion in the tire radial direction as viewed in a meridian cross-section, and the tread portion 2 is formed of tread rubber 2a that is a rubber composition. The surface of the tread portion 2, that is, a portion that comes into contact with a road surface during traveling of a vehicle (not illustrated) mounted with the pneumatic tire 1, is formed as a ground contact surface 3.

A plurality of grooves such as circumferential grooves 15 extending in the tire circumferential direction and lug grooves extending in the tire width direction are formed in the ground contact surface 3 of the tread portion 2, and a plurality of land portions 10 are defined and formed in the tread portion 2 by the grooves.

Additionally, both ends of the tread portion 2 in the tire width direction are formed as shoulder portions 4, and sidewall portions 5 are each disposed from the corresponding shoulder portion 4 to a predetermined position on an inner side in the tire radial direction. In other words, the sidewall portions 5 are disposed at two positions on the respective sides of the pneumatic tire 1 in the tire width direction. The sidewall portion 5 includes sidewall rubber 5a, which is a rubber composition. Additionally, a rim check line 9 is formed at a position on a more inner side in the tire radial direction in each of the sidewall portions 5 on both sides in the tire width direction. The rim check line 9 projects from the surface of the sidewall portion 5 and is formed all around the circumference in the tire circumferential direction.

Furthermore, a bead portion 20 is located on the inner side of each sidewall portion 5 in the tire radial direction, and like the sidewall portion 5, the bead portion 20 is disposed at two positions on the respective sides of the tire equatorial plane CL. In other words, a pair of the bead portions 20 are disposed on both sides of the tire equatorial plane CL in the tire width direction. Each of the pair of bead portions 20 is provided with a bead core 21, and a bead filler 50 is provided on the outer side of each bead core 21 in the tire radial direction. The bead core 21 is formed by winding a bead wire, which is a steel wire, into a ring shape. The bead filler 50 is a rubber material disposed in a space formed by folding back an end portion of a carcass 6 described below outward in the tire width direction at the position of the bead core 21. Additionally, the bead filler 50 includes a lower filler 51 disposed in contact with an outer circumferential surface of the bead core 21, and an upper filler 52 disposed at a position on a more outer side in the tire radial direction than the lower filler 51.

The bead portion 20 is configured to be mountable on a rim wheel including a 5°-taper specified rim R. Specifically, the pneumatic tire 1 according to the present embodiment can be mounted on a specified rim R including a portion fitted to the bead portion 20 the portion inclined in a direction toward an outer side in the tire radial direction as the portion extends from an inner side toward an outer side in the tire width direction at an inclination angle of 5°±1° with respect to the rotation axis of the rim wheel. Note that "specified rim" refers to an "applicable rim" defined by the JATMA (The Japan Automobile Tyre Manufacturers Association, Inc.), a "Design Rim" defined by the TRA (The Tire and Rim Association, Inc.), or a "Measuring Rim" defined by the ETRTO (The European Tyre and Rim Technical Organisation).

A belt layer 7 is provided on the inner side of the tread portion 2 in the tire radial direction. The belt layer 7 has a multilayer structure in which three or more belt plies are layered, and in a typical OR tire, four to eight belt plies are layered. In the present embodiment, the belt layer 7 is layered with five belt plies 7a, 7b, 7c, 7d, and 7e. The belt plies 7a, 7b, 7c, 7d, and 7e included in the belt layer 7 are formed by coating a plurality of belt cords made of steel or an organic fiber material with coating rubber and rolling the resultant belt cords. Additionally, the belt cords of the belt plies 7a, 7b, 7c, 7d, and 7e have different inclination angles in the tire width direction with respect to the tire circumferential direction, and the belt plies are layered such that the inclination directions of the belt cords intersect one another, and are thus configured into a what is called crossply structure. Thus, the structural strength of the belt layer 7 is increased. The five belt plies 7a, 7b, 7c, 7d, and 7e include, for example, a large-angle belt 7a, a pair of cross belts 7b and 7c, a belt cover 7d, and a circumferential reinforcing layer 7e.

On the inner side of the belt layer 7 in the tire radial direction and on a tire equatorial plane CL side of the sidewall portion 5, a carcass 6 used as a reinforcing layer is continuously provided. The carcass 6 has a single layer structure made of one carcass ply or a multilayer structure made of a plurality of carcass plies, and extends between the bead cores 21 on the respective sides in the tire width direction in a toroidal shape, forming the backbone of the tire. Specifically, the carcass 6 is disposed extending from one of the pair of bead portions 20 each located on both sides in the tire width direction to the other of the bead portions 20, and is turned back outward in the tire width direction along the bead core 21 while wrapping around the bead cores 21 and the bead fillers 50. In other words, the carcass 6 is folded back around the bead core 21 at the bead portion 20 and disposed to extend from the inner side of the bead core 21 in the tire width direction through the inner side of the bead core 21 in the tire radial direction to the outer side of the bead core 21 in the tire width direction. Accordingly, the carcass 6 is disposed between the inner side and the outer side of the bead core 21 in the tire width direction.

Figure 2:
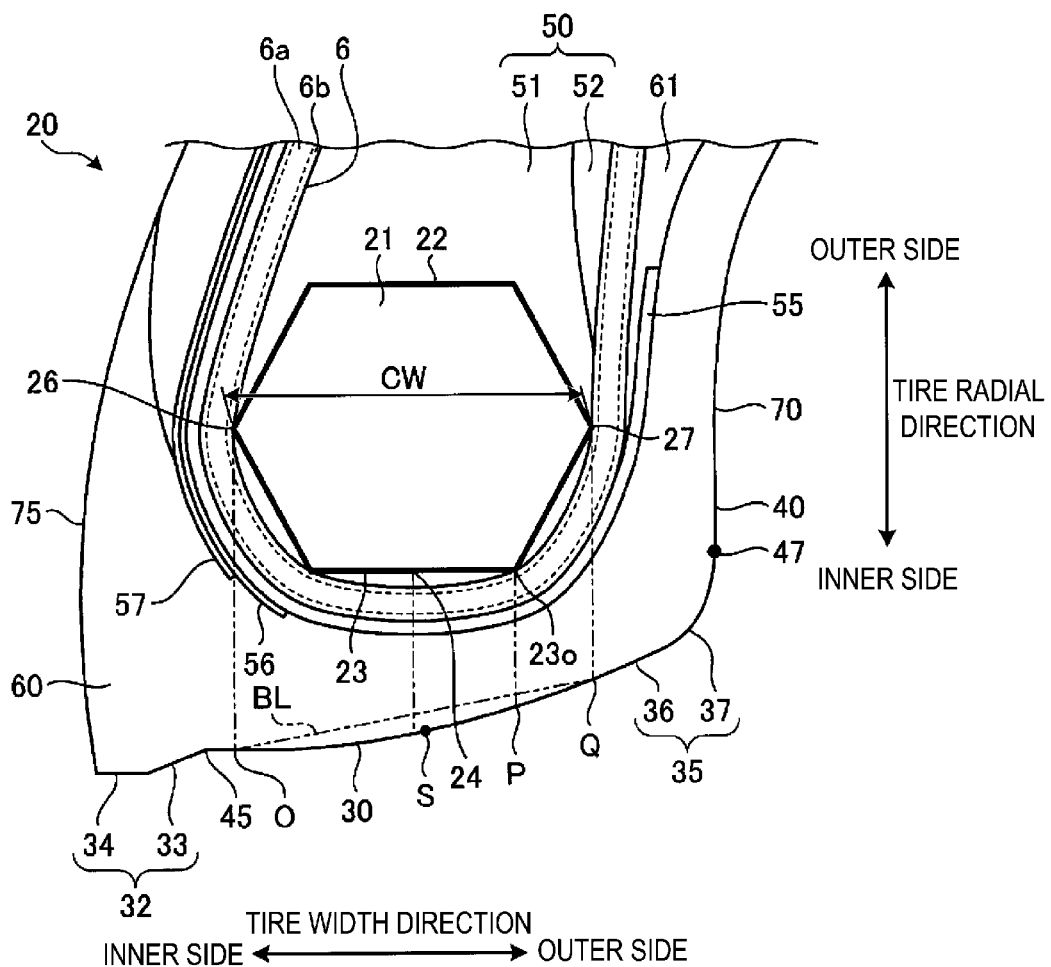
FIG. 2 is a detailed view of portion A of FIG. 1.

The carcass ply of the carcass 6 disposed in this manner is formed by coating a plurality of carcass cords 6a formed of cord members made from steel or an organic fiber material such as aramid, nylon, polyester, rayon, or the like with coat rubber 6b, which is a rubber member and rolling the resultant cords (see FIG. 2). Additionally, the carcass 6 has a carcass angle of 85° or more and 95° or less; the carcass angle being the inclination angle of the carcass cords 6a with respect to the tire circumferential direction.

Additionally, an innerliner 8 is formed along the carcass 6 on the inward side of the carcass 6 or on the inner side of the carcass 6 in the pneumatic tire 1.

FIG. 2 is a detailed view of portion A of FIG. 1. A chafer including a reinforcing layer reinforcing the carcass 6, is disposed in a portion of the carcass 6 that is folded back around the bead core 21. Examples of the chafer applied include a steel chafer formed using steel cords as cord members, or a nylon chafer formed using cord members made from an organic fiber material.

The nylon chafer includes, for example, a sheet-shaped member formed by arranging and rolling a plurality of organic fiber cords, a fabric formed by weaving a plurality of organic fiber cords, or a composite material formed by rubberizing the sheet-shaped member or the fabric. In the present embodiment, three chafers are used including a steel chafer 55 formed using steel cords, and sub-chafers 56 and 57 including nylon chafers, and the three chafers are disposed in a layered manner.

Of these chafers, the steel chafer 55 is disposed on top of the carcass 6 outward of the folded back portion of the carcass 6, and is, like the carcass 6, folded back around the bead core 21 from the inner side to the outer side in the tire width direction and disposed continuously in the tire circumferential direction. That is, in a portion where the carcass 6 is positioned on the inner side of the bead core 21 in the tire width direction, the steel chafer 55 is located on the inner side of the carcass 6 in the tire width direction, and in a portion where the carcass 6 is positioned on the inner side of the bead core 21 in the tire radial direction, the steel chafer 55 is located on the inner side of the carcass 6 in the tire radial direction, and in a portion where the carcass 6 is positioned on the outer side of the bead core 21 in the tire width direction, the steel chafer 55 is located on the outer side of the carcass 6 in the tire width direction.

Additionally, the sub-chafers 56 and 57 are disposed on top of each other on the side, in the thickness direction, of the steel chafer 55 opposite to the side where the carcass 6 is located. In addition, unlike the steel chafer 55, the sub-chafers 56 and 57 are not folded back around the bead core 21 from the inner side to the outer side in the tire width direction, and are mainly disposed within the range of the inner side of the bead core 21 in the tire width direction and from the range of the inner side of the bead core 21 in the tire width direction to a position on the outer side in the tire radial direction, and is provided continuously in the tire circumferential direction. Assuming that, in the tire meridian cross-section, corresponding to the meridian cross-section of the pneumatic tire 1, the side on which the bead core 21 is located in the thickness direction of the chafers refers to inward, and the side opposite to the side where the bead core 21 is located refers to outward, the steel chafer 55 is disposed most inward, the sub-chafer 56 is disposed outward of the steel chafer 55, and the sub-chafer 57 is disposed outward of the sub-chafer 56, as described above. The sub-chafers 56 and 57 disposed on the outer side of the steel chafer 55 are auxiliary reinforcing layers.

Additionally, shock absorbing rubber 61 is disposed by being sandwiched between the carcass 6 and the steel chafer 55. Specifically, the shock absorbing rubber 61 is disposed between a portion of the carcass 6 located on the outer side of the bead core 21 in the tire width direction and a portion of the steel chafer 55 located on the outer side of the bead core 21 in the tire width direction. Additionally, the shock absorbing rubber 61 is also disposed in a region on the outer side of the steel chafer 55 in the tire radial direction in the tire meridian cross section. That is, the shock absorbing rubber 61 is disposed between the carcass 6 and the carcass 55 within the range in which the steel chafer 55 is disposed in the tire radial direction, and the shock absorbing rubber 61 is disposed along a portion located on the outer side of the bead core 21 in the tire width direction to a region on the outer side of the steel chafer 55 in the tire radial direction.

Furthermore, rim cushion rubber 60 is disposed outward of the steel chafer 55. Like the steel chafer 55, the rim cushion rubber 60 is disposed from the inner side of the bead core 21 in the tire width direction to the inner side of the bead core 21 in the tire radial direction and the outer side of the bead core 21 in the tire radial direction, and is provided continuously in the tire circumferential direction. The rim cushion rubber 60 disposed in this manner forms a contact surface of the bead portion 20 for a flange of the specified rim R.

Additionally, the bead core 21 formed by rolling a bead wire in a ring shape is formed substantially in a hexagonal shape as viewed in the meridian cross-section. Specifically, the bead core 21 is formed such that a bead core bottom 23 corresponding to an inner circumferential surface of the bead core 21 and an outer circumferential surface 22 of the bead core in the overall view of the bead core 21 are substantially parallel to each other, and the bead core 21 is formed, at positions on the respective end sides in the tire width direction, in a substantially hexagonal shape having corner portions projecting in the tire width direction, the bead core bottom 23, which is an inner circumferential surface of the bead cores 21 when viewed throughout the bead core 21, and has corner portions projecting in the tire width direction at positions on both end sides in the tire width direction.

Note that in this case, the "bead core bottom 23 of the bead core 21" refers to, in the tire meridian cross-section, a surface indicated by an imaginary straight line contacting a portion of a plurality of bead wires disposed in a row at a position on the inner side of the bead core 21 in the tire radial direction to form the surface of the bead core 21, the portion being exposed from the surface side of the bead core 21. Similarly, the "outer circumferential surface 22 of the bead core 21" refers to, in a case where the pneumatic tire 1 is viewed in the tire meridian cross-section, a surface indicated by an imaginary straight line contacting a portion of a plurality of bead wires disposed in a row at a position on the outer side of the bead core 21 in the tire radial direction to form the surface of the bead core 21, the portion being exposed from the surface side of the bead core 21.

Additionally, the bead portion 20 includes a bead base portion 30 formed on an inner circumferential surface of the bead portion 20, a toe portion 32 located on the inner side of the bead base portion 30 in the tire width direction, a heel portion 35 located on the outer side of the bead base portion 30 in the tire width direction, and a back surface portion 40 located on the outer side of the heel portion 35 in the tire radial direction and facing the outer side in the tire width direction. Additionally, an inner circumferential surface of the bead portion 20 is generally inclined with respect to the tire rotation axis in a direction in which the overall shape of the inner circumferential surface in the tire meridian cross section diverges outward in the tire radial direction from the inner side in the tire width direction toward the outer side in the tire width direction. Thus, the heel portion 35 located on the outer side of the bead base portion 30 in the tire width direction is located on the outer side, in the tire radial direction, of the toe portion 32 located on the inner side of the bead base portion 30 in the tire width direction.

The bead base portion 30 formed on the inner circumferential surface of the bead portion 20 is located on the inner side of the bead core 21 in the tire radial direction, and forms a wide range of the inner circumferential surface of the bead portion 20. Specifically, the bead base portion 30 includes a region between a core lower inner end portion position O located where a position on the inner circumferential surface of the bead portion 20 in the tire width direction is identical to the position of a bead core inner end portion 26 in the tire width direction and a core lower outer end portion position Q where the position on the inner circumferential surface of the bead portion 20 in the tire width direction is identical to the position of a bead core outer end portion 27 in the tire width direction.

Note that the bead core inner end portion 26 is a tire width direction inner end portion of the bead core 21 in the tire meridian cross-section, and the bead core outer end portion 27 is a tire width direction outer end portion of the bead core 21 in the meridian cross-section. Specifically, the bead core inner end portion 26 is located at the center of one of the bead wires included in the bead core 21 that is located innermost in the tire width direction in the tire meridian cross-section, and the bead core outer end portion 27 is located at the center of the bead wire that is included in the bead wires forming the bead core 21 and that is located outermost in the tire width direction in the tire meridian cross-section.

Additionally, the bead base portion 30 has a curved line projecting toward the inner side in the tire radial direction in the tire meridian cross-section, and the range between the core lower inner end portion position O and the core lower outer end portion position Q in the bead base portion 30 includes a curved line projecting toward the outer side in the tire radial direction in the tire meridian cross-section. In other words, for the bead base portion 30, at least the entire range between the core lower inner end portion position O and the core lower outer end portion position Q is formed in a shape curved to project toward the inner side in the tire radial direction in the tire meridian cross-section.

As described above, in the bead base portion 30 formed projecting toward the inner side in the tire radial direction in the tire meridian cross-section, the position of the outermost projection portion S in the tire width direction is located between the position of the bead core bottom center 24 in the tire width direction corresponding to the center of the bead core bottom 23 in the tire width direction and the position in the tire width direction of an outer end portion 23o of the bead core bottom 23 in the tire width direction. In this case, the outermost projection portion S of the bead base portion 30 is located farthest from a reference line BL indicating a virtual straight line connecting the core lower inner end portion position O and the core lower outer end portion position Q of the bead base portion 30 in the tire meridian cross-section, in a direction orthogonal to the reference line BL. Additionally, the outer end portion 23o of the bead core bottom 23 is located at the center of the bead wire that is included in the bead wires forming the bead core bottom 23 and that is located outermost in the tire width direction in the tire meridian cross-section. For the bead base portion 30, the range between the core lower inner end portion position O and the core lower outer end portion position Q includes a curved line projecting toward the inner side in the tire radial direction in the tire meridian cross-section, and thus within the range between the core lower inner end portion position O and the core lower outer end portion position Q, any portion of the bead base portion 30 is located on the inner side of the reference line BL in the tire radial direction.

Note that the bead base portion 30 is preferably formed such that the outermost projection portion S is separated from the reference line BL at a distance of 1.0 mm or longer and 5.0 mm or shorter. Additionally, in the bead portion 20, the overall shape of the inner circumferential surface in the tire meridian cross-section is generally inclined with respect to the tire rotation axis in the direction in which the inner circumferential surface diverges outward in the tire radial direction from the inner side in the tire width direction toward the outer side in the tire width direction, and thus in the bead base portion 30 as well, the core lower outer end portion position Q is located on the outer side of the core lower inner end portion position O in the tire radial direction.

Additionally, the toe portion 32 located on the inner side of the bead base portion 30 in the tire width direction includes a straight line in the tire meridian cross-section and projects inward from the bead base portion 30 in the tire radial direction. Specifically, the toe portion 32 includes an inclined portion 33 and an inner end portion 34 formed like respective straight lines in the tire meridian cross-section, and the inclined portion 33 is connected to the tire width direction inner end portion of the bead base portion 30. In the present embodiment, the bead base portion 30 curves to project toward the inner side in the tire radial direction and curves, while extending inward in the tire width direction beyond the core lower inner end portion position O, and the inclined portion 33 is connected to the tire width direction inner end portion of the bead base portion 30 at an inner position in the tire width direction beyond the core lower inner end portion position O. The inclined portion 33 of the toe portion 32 is inclined with respect to the tire rotation axis in a direction in which the inclined portion 33 diverges toward the outer side in the tire radial direction as the inclined portion 33 extends from the inner side in the tire width direction toward the outer side in the tire width direction. In other words, the inclined portion 33 of the toe portion 32 is inclined with respect to the tire rotation axis in a direction in which the diameter in the tire radial direction decreases inward in the tire width direction from the end portion of the inclined portion 33 connected to the bead base portion 30.

Additionally, the inner end portion 34 of the toe portion 32 is formed by being bent in a direction in which the inclination angle with respect to the tire rotation axis decreases from the inner end portion of the inclined portion 33 in the tire width direction, and corresponds to a portion of the toe portion 32 located innermost in the tire radial direction. The inclined portion 33 and the inner end portion 34 are formed as described above to form the toe portion 32 projecting inward from the bead base portion 30 in the tire radial direction. Additionally, an inner end portion of the toe portion 32 in the tire width direction, that is, the inner end portion of the inner end portion 34 in the tire width direction, is connected to a tire inner surface 75.

In addition, the inclined portion 33 of the toe portion 32, inclined with respect to the tire rotation axis in the direction in which the toe portion 32 diverges in the tire radial direction from the inner side in the tire width direction toward the outer side in the tire width direction, is connected to the bead base portion 30, and thus the bead base portion 30 and the toe portion 32 are connected through a toe side bent portion 45 including a bent portion projecting to bend toward the outer side in the tire radial direction. The toe side bent portion 45 is located on the inner side of the core lower inner end portion position O of the bead base portion 30 in the tire width direction, that is, the toe side bent portion 45 is located, in the tire width direction, on the inner side of the position in the tire width direction of the bead core inner end portion 26 corresponding to the inner end portion of the bead core 21 in the tire width direction.

Additionally, in the present embodiment, the heel portion 35 is located within the range from the core lower outer end portion position Q to a tire radial direction inner end portion of the back surface portion 40, and the heel portion 35 is connected to the back surface portion 40 through the arc portion 37 of the heel portion 35. The arc portion 37 of the heel portion 35 is formed in an arc shape projecting in an intermediate direction between the outer side in the tire width direction and the inner side in the tire radial direction in the tire meridian cross-section, and a tire radial direction outer end portion of the arc portion 37 in the tire meridian cross-section is connected to a tire radial direction inner end portion of the back surface portion 40 to connect the heel portion 35 to the back surface portion 40. Note that the arc portion 37 formed in an arc shape in the tire meridian cross-section preferably has a radius of 10 mm or larger and 20 mm or smaller in the tire meridian cross-section.

In addition, the portion between the arc portion 37 of the heel portion 35 and the core lower outer end portion position Q corresponds to an intermediate portion 36, and a tire radial direction inner end portion of the arc portion 37 is connected to a tire width direction outer end portion of the intermediate portion 36. In the tire meridian cross-section, the intermediate portion 36 of the heel portion 35 is formed in a shape in which the curved line of the bead base portion 30 extends continuously on the outer side of the core lower outer end portion position Q in the tire width direction. Thus, the intermediate portion 36 of the heel portion 35 has a shape continuous from the bead base portion 30 and is, similarly to the bead base portion 30, formed into a curved line projecting toward the inner side in the tire radial direction in the tire meridian cross-section.

Additionally, the connection portion 47, where the arc portion 37 and the back surface portion 40 are connected, is located within the range between the position in the tire radial direction of the maximum width CW portion of the bead core 21 in the tire meridian cross-section, and the position of the bead core bottom 23 in the tire radial direction.

In this case, the maximum width CW of the bead core 21 corresponds to a distance between the bead core inner end portion 26, corresponding to the tire width direction inner end portion of the bead core 21, and the bead core outer end portion 27, corresponding to the tire width direction outer end portion of the bead core 21. Additionally, in a case where the bead core inner end portion 26 and the bead core outer end portion 27 differ in position in the tire radial direction, the position of the maximum width CW portion of the bead core 21 in the tire radial direction is the position in the tire radial direction of one of the bead core inner end portion 26 and the bead core outer end portion 27 that is located on the outer side in the tire radial direction. For the connection portion 47 between the arc portion 37 and the back surface portion 40, the position in the tire radial direction is within the range between the position in the tire radial direction of the maximum width CW portion of the bead core 21 defined as described above and the position of the bead core bottom 23 in the tire radial direction, and in the present embodiment, the position of the connection portion 47 in the tire radial direction is substantially the same as the position of the bead core bottom 23 in the tire radial direction.

Figure 3:
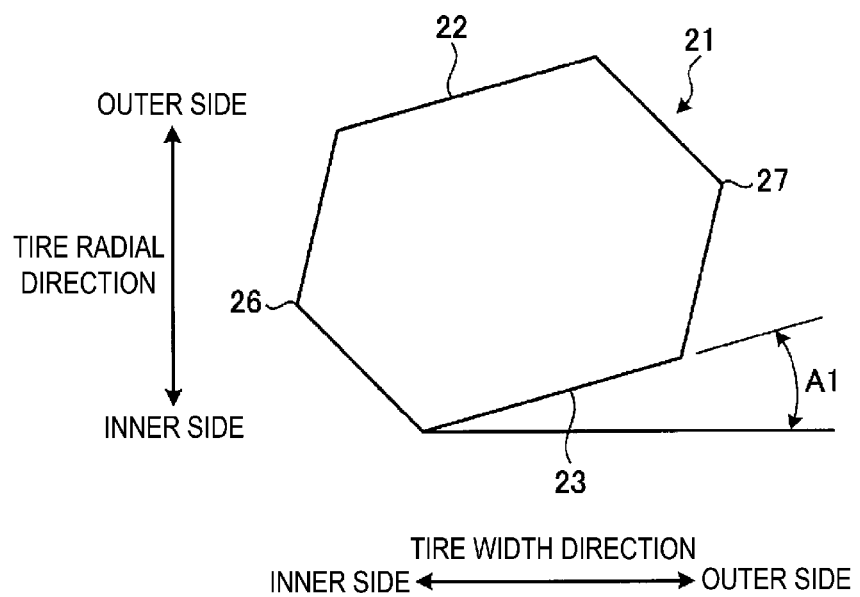
FIG. 3 is an explanatory diagram of the inclination of a bead core bottom.

FIG. 3 is an explanatory diagram of the inclination of the bead core bottom 23. The bead core 21 having a hexagonal cross-sectional shape is inclined within the range of 0° or larger and 5° or smaller with respect to the tire rotation axis in a direction in which the bead core bottom 23 diverges toward the outer side in the tire radial direction as the bead core bottom 23 extends from the inner side in the tire width direction toward the outer side in the tire width direction. Specifically, the bead core bottom 23 is formed parallel to the tire rotation axis, or is formed slightly inclined in the direction in which the bead core bottom 23 diverges toward the outer side in the tire radial direction as the bead core bottom 23 extends from the inner side in the tire width direction toward the outer side in the tire width direction, and an angle A1 to a line parallel to the tire rotation axis is within the range of 0° or larger and 5° or smaller.

Note that the angle A1 of the bead core bottom 23 is obtained in a case where the spacing between the pair of bead portions 20 located on both sides of the tire equatorial plane CL in the tire width direction is set equal to an angle obtained with the pneumatic tire 1 mounted on the specified rim R. In other words, because the pneumatic tire 1 is deflected, the angle, to the tire rotation axis, of the bead portion 20 with the bead core 21 varies depending on the condition of the deflection of the pneumatic tire 1. The angle A1 defined as the angle of the bead core bottom 23 is obtained in a case where the spacing between the pair of bead portions 20 is set equal to the spacing obtained with the pneumatic tire 1 mounted on the specified rim R. In other words, with the pneumatic tire 1 not mounted on the specified rim R and with the spacing between the bead portions 20 on both sides in the tire width direction set equal to the spacing obtained with the pneumatic tire 1 mounted on the specified rim R, the angle A1 of the bead core bottom 23 with respect to the tire rotation axis is within the range of 0° or larger and 5° or smaller.

Figure 4:
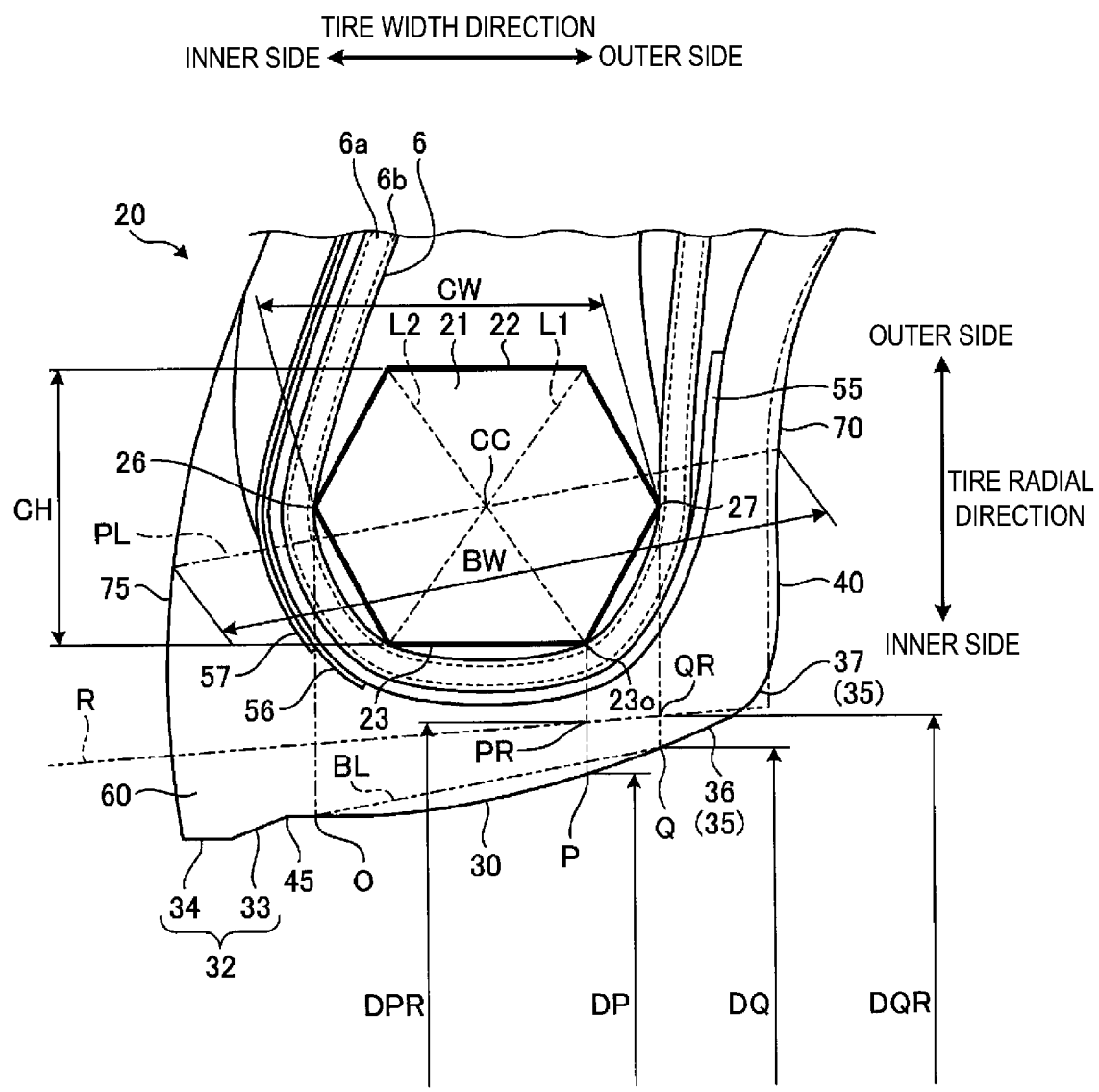
FIG. 4 is an explanatory diagram of specifications around a bead core.

FIG. 4 is an explanatory diagram of specifications around the bead core 21. The maximum width CW of the bead core 21 with respect to the bead width BW indicating the width of the bead portion 20 in the tire meridian cross-section is within the range of $(BW \times 0.54) \leq CW \leq (BW \times 0.58)$. The bead width BW in this case corresponds to the distance between the tire inner surface 75 and a tire outer surface 70 on a straight line PL parallel to the reference line BL extending through a bead core center CC corresponding to the center of the bead core 21 in the tire meridian cross-section and connecting the core lower inner end portion position O and the core lower outer end portion position Q of the bead base portion 30. In the pneumatic tire 1 according to the present embodiment, the bead width BW is within the range of $(0.265x+20.5)$ mm $\leq BW \leq (0.265x+26.5)$ mm with respect to the specified load x kN.

Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

Additionally, the bead core center CC is, in the tire meridian cross-section, an intersection portion between an imaginary line L1 connecting the tire width direction outer end portion of the outer circumferential surface 22 of the bead core 21 and the tire width direction inner end portion of the bead core bottom 23 and an imaginary line L2 connecting the tire width direction inner end portion of the outer circumferential surface 22 and the tire width direction outer end portion of the bead core bottom 23. Specifically, in the tire meridian cross-section, the imaginary line L1 connects the center of the bead wire that is included in the bead wires forming the outer circumferential surface 22 of the bead core 21 and that is located outermost in the tire width direction and the center of the bead wire that is included in the bead wires forming the bead core bottom 23 and that is located innermost in the tire width direction. Similarly, in the tire meridian cross-section, the imaginary line L2 connects the center of the bead wire that is included in the bead wires forming the outer circumferential surface 22 of the bead core 21 and that is located innermost in the tire width direction and the center of the bead wire that is included in the bead wires forming the bead core bottom 23 and that is located outermost in the tire width direction.

Additionally, for the bead core 21, the relationship between the maximum width CW and the height CH in the tire radial direction in the tire meridian cross-section is within the range of $1.0 \leq (CW/CH) < 1.5$. Note that, for the height CH of the bead core 21, the distance between the outer circumferential surface 22 and the bead core bottom 23 in the tire meridian cross-section may be used as the height CH of the bead core 21.

Additionally, the bead core 21 formed substantially in a hexagonal shape as viewed in the tire meridian cross-section is preferably shaped such that the distance in the tire width direction between the bead core outer end portion 27 and the outer end portion 23o of the bead core bottom 23 in the tire width direction in the tire meridian cross-section is within the range of $\{(CH/2)/1.73\}$ mm±3.0 mm.

Additionally, the bead core 21 is preferably disposed on the inner side of the back surface portion 40 in the tire width direction within the range of (0.004x+13.5) mm±3.0 mm with respect to a specified load x kN. In this case, the distance between the bead core 21 and the back surface portion 40 is equal to the distance in the tire width direction between the bead core outer end portion 27 and the back surface portion 40.

Additionally, for the bead portion 20, the value of {(rim diameter−tire inner diameter)/rim diameter×100} varies depending on the position of the bead portion 20 in the tire width direction; the value is calculated using the tire inner diameter corresponding to the diameter of the bead portion 20 at a predetermined position in the tire width direction, and a rim diameter corresponding to the diameter of the specified rim R at the same tire width direction position as that of the tire inner diameter. Additionally, the bead portion 20 includes, within the range between the position on the heel portion 35 where the heel portion 35 is connected to the back surface portion 40 and the position of the core lower outer end portion position Q, a portion where the relationship between a diameter Dn of the inner circumferential surface of the bead portion 20 and a diameter DnR of the specified rim R for which the position in the tire width direction is identical is, in a case where (DnR−Dn)/DnR× 100 is calculated, 0%, a portion where the relationship is less than 0%, and a portion where the relationship is more than 0%.

In other words, the heel portion 35 includes a portion where {(rim diameter DnR−tire inner diameter Dn)/rim diameter DnR×100} is 0%, within the range between the connection portion 47 with the back surface portion 40 and the core lower outer end portion position Q. Furthermore, the heel portion 35 is formed such that {(rim diameter DnR−tire inner diameter Dn)/rim diameter DnR×100} is less than 0% on the outer side, in the tire width direction, of the portion where {(rim diameter DnR−tire inner diameter Dn)/rim diameter DnR×100} is 0%, and is more than 0% on the inner side of the above-described portion in the tire width direction. In the present embodiment, the heel portion 35 includes, at the position of the arc portion 37, the portion where {(rim diameter DnR−tire inner diameter Dn)/rim diameter DnR×100} is 0%.

Additionally, for the bead base portion 30, the value of {(rim diameter−tire inner diameter)/rim diameter×100} at a core bottom outer end portion lower position P where the position in the tire width direction is identical to the position of the outer end portion 23o of the bead core bottom 23 in the tire width direction is at least 0.2% larger than {(rim diameter−tire inner diameter)/rim diameter×100} of the core lower outer end portion position Q. That is, assuming that, for the bead base portion 30, DP is the diameter at the core bottom outer end portion lower position P, DQ is the diameter at the core lower outer end portion position Q, DPR is the diameter at a position PR on the specified rim R corresponding to the core bottom outer end portion lower position P, and DQR is the diameter at a position QR on the specified rim R corresponding to the core lower outer end portion position Q, (DPR−DP)/DPR×100 is at least 0.2% larger than (DQR−DQ)/DQR×100.

Note that the position PR on the specified rim R corresponding to the core bottom outer end portion lower position P is a position where the core bottom outer end portion lower position P of the bead base portion 30 contacts the specified rim R while the pneumatic tire 1 is mounted on the specified rim R. Additionally, the position QR on the specified rim R corresponding to the core lower outer end portion position Q is a position where the core lower outer end portion position Q of the bead base portion 30 contacts the specified rim R while the pneumatic tire 1 is mounted on the specified rim R. Additionally, {(rim diameter DPR−tire inner diameter DP)/rim diameter DPR×100} at the core bottom outer end portion lower position P is preferably within the range of 1.7% or more and 2.0% or less, and {(rim diameter DQR−tire inner diameter DQ)/rim diameter DQR×100} at the core lower outer end portion position Q is preferably within the range of 1.2% or more and 1.4% or less.

As described above, the bead portion 20 is formed such that the value of {(rim diameter−tire inner diameter)/rim diameter×100} varies depending on the position of the bead portion 20 in the tire width direction, and that, at least within the range from the back surface portion 40 to the core bottom outer end portion lower position P, the value of {(rim diameter−tire inner diameter)/rim diameter×100} tends to increase from the back surface portion 40 side toward the core bottom outer end lower position P side.

Figure 5:
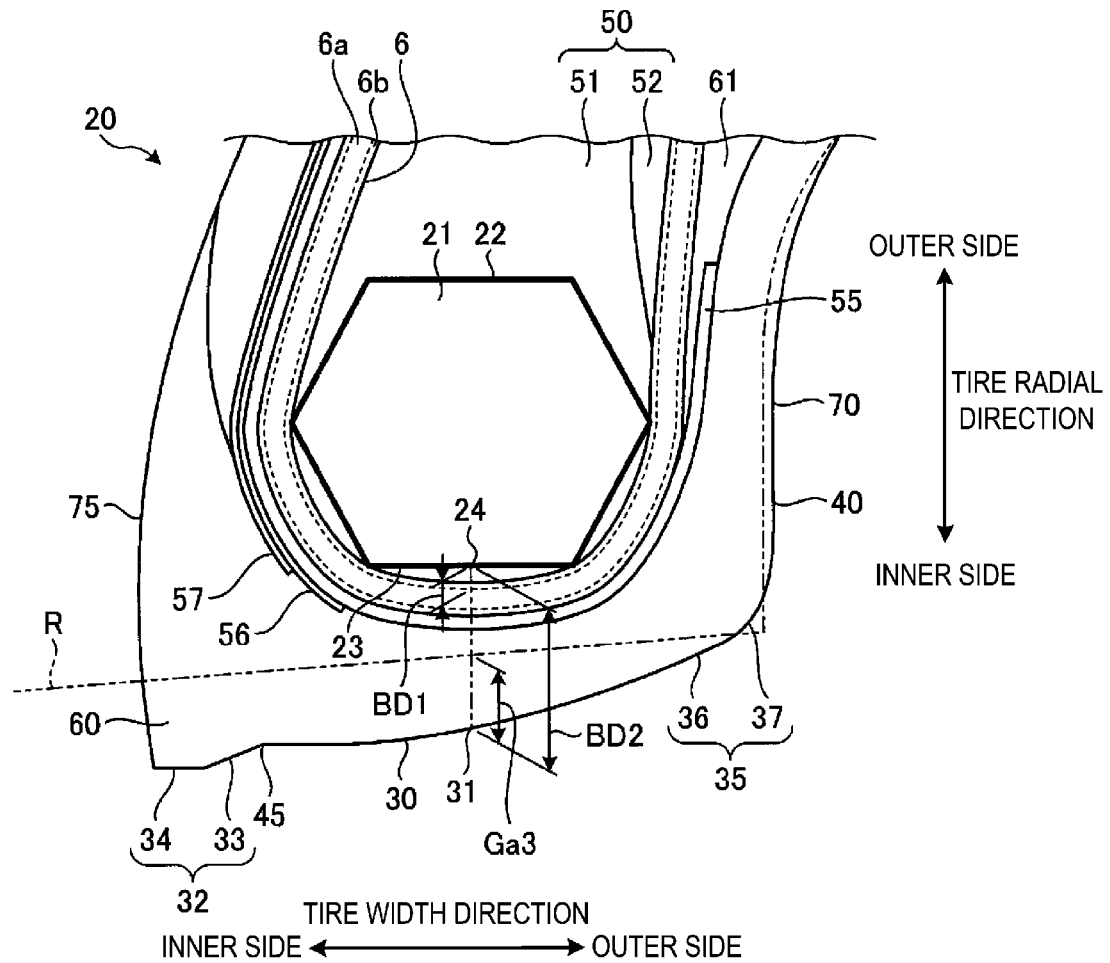
FIG. 5 is an explanatory diagram of the thickness and the compression ratio of rubber located on the inner side of the bead core in the tire radial direction.

FIG. 5 is an explanatory diagram of the thickness and compression ratio of rubber located on the inner side of the bead core 21 in the tire radial direction. For the bead portion 20, with the pneumatic tire 1 not mounted on the specified rim R, a distance BD1 in the tire radial direction in the tire meridian cross-section, from the bead core bottom center 24, corresponding to the center of the bead core bottom 23, to the surface of the carcass cord 6a in a portion of the carcass 6 located on the inner side of the bead core 21 in the tire radial direction is within the range of 2.0 mm or longer and 3.5 mm or shorter. Specifically, the distance BD1 is a distance between the bead core bottom center 24 and the position of the bead core bottom center 24 in the tire width direction, the position being included in the surface of the bead code 21-side carcass cord 6a of the portion of the carcass 6 located on the inner side of the bead core 21 in the tire radial direction. In other words, a slight amount of rubber member is present between the bead core 21 and the carcass 6 located on the inner side of the bead core 21 in the tire radial direction, but for the bead portion 20, a thickness Ga1 from the bead core bottom center 24 to the surface of the carcass cords 6a in the portion of the carcass 6 located on the inner side of the bead core 21 in the tire radial direction in the tire meridian cross-section; is within the range of 2.0 mm or longer and 3.5 mm or shorter.

In a case where the pneumatic tire 1 is mounted on the specified rim R, the rubber located on the inner side of the bead core 21 in the tire radial direction is compressed to allow the bead portion 20 to allow pressure from the outer side to the inner side in the tire radial direction to be applied to the specified rim R, enabling a fitting force to be exerted on the specified rim R. As described above, in a case where the pneumatic tire 1 is mounted on the specified rim R, the compression ratio of the rubber located on the inner side of the bead core 21 in the tire radial direction is within the range of 45% or more and 55% or less at a position on the inner side of the bead core bottom center 24 in the tire radial direction in the tire meridian cross-section.

In this case, the compression ratio corresponds to the ratio of, to a thickness Ga2 obtained by subtracting the thickness of the members other than the rubber member such as the cord member of the carcass 6 or the chafer from the distance BD2 in the tire radial direction between the bead core bottom center 24 and the bead base portion 30 in the time meridian cross-section before the pneumatic tire 1 is mounted on the specified rim R, a thickness Ga3 of the rubber member compressed in the tire radial direction in a case where the pneumatic tire 1 is mounted on the specified rim R. In other words, in a case where the pneumatic tire 1 is mounted on the specified rim R, a compression ratio Z of the rubber located on the inner side of the bead core 21 in the tire radial direction has a value calculated by Formula (1) below. In the pneumatic tire 1 according to the present embodiment, the compression ratio Z calculated by Formula (1) is within the range of 45% or more and 55% or less.

$$\text{Compression ratio } Z = (Ga3/Ga2) \times 100 \quad (1)$$

Note that the thickness Ga3 of the rubber member compressed in the tire radial direction in a case where the pneumatic tire 1 is mounted on the specified rim R, the thickness Ga3 being used in Formula (1), is specifically defined as an amount of displacement in the tire radial direction between before and after mounting of the pneumatic tire 1 on the specified rim R at a reference position 31, corresponding to a portion of the bead base portion 30 corresponding to the same position of the bead core bottom center 24 in the tire width direction.

In a case where the pneumatic tire 1 configured as described above is mounted on a vehicle, first, the bead base portion 30, the toe portion 32, and the heel portion 35 are fitted to the specified rim R of the rim wheel to mount the pneumatic tire 1 on the specified rim, and the pneumatic tire 1 is mounted on the rim wheel. Once mounted on the rim, the pneumatic tire 1 is inflated, and the pneumatic tire 1 inflated is mounted on the vehicle. The pneumatic tire 1 according to the present embodiment is used, for example, as a pneumatic tire 1 for a construction vehicle, the pneumatic tire 1 to be mounted in the construction vehicle such as a wheel loader.

In a case where the vehicle equipped with the pneumatic tire 1 is driven, the pneumatic tire 1 rotates with the portion of the ground contact surface 3 located on a lower side in contact with the road surface. The vehicle travels by transferring a driving force and a braking force to the road surface or generating a turning force due to the friction force between the ground contact surface 3 and the road surface. For example, in a case where the driving force is transferred to the road surface, power generated by a prime mover such as an engine of the vehicle is transferred to the rim wheel, and then transferred from the rim wheel to the pneumatic tire 1.

Here, the rim wheel and the pneumatic tire 1 are mounted on each other by a fastening force corresponding to the fitting force exerted on the specified rim R of the rim wheel by the bead portion 20 of the pneumatic tire 1, that is, the rim wheel and the pneumatic tire 1 are mounted between the bead portion 20 and the rim wheel by a friction force. The fastening force by the bead portion 20 is ensured by the bead core 21 formed by winding the bead wire in a ring shape.

In other words, in a case where the pneumatic tire 1 is mounted on the rim wheel, the rubber member such as the rim cushion rubber 60 located on the inner side of bead core 21 of the bead portion 20 in the tire radial direction is compressed between the bead core 21 and the specified rim R, causing the pneumatic tire 1 to exert, on the specified rim R, pressure acting toward the inner side in the tire radial direction. The pressure acts as the fastening force on the specified rim R by the bead portion 20, and the fastening force generates a high friction force between the pneumatic tire 1 and the specified rim R to fit the pneumatic tire 1 to the specified rim R to mount the pneumatic tire 1 on the rim wheel.

Since the pneumatic tire 1 is thus mounted on the rim wheel by the friction force associated with the fastening force of the bead portion 20, in a case where, compared to the friction force, a high rotational torque is generated between the pneumatic tire 1 and the rim wheel, slippage may occur between the pneumatic tire 1 and the rim wheel. For example, in a case where the bead portion 20 exerts a weak fastening force and a high rotational torque is transferred from the rim wheel to the pneumatic tire 1, the rotational torque overcomes a restricting force caused by the friction force between the bead portion 20 and the rim wheel, and slippage may occur between the bead portion 20 and the rim wheel. The pneumatic tire 1 according to the present embodiment is configured to enable slippage between the bead portion 20 and the rim wheel to be suppressed.

Specifically, a portion of the specified rim R of the rim wheel that is fitted to the bead base portion 30 of the pneumatic tire 1 is inclined at an angle of 5°±1° with respect to the rotation axis of the rim wheel, while the bead core 21 has the bead core bottom 23 formed at an inclination angle A1 within the range of 0° or larger and 5° or smaller with respect to the tire rotation axis. Thus, the bead core 21 can appropriately compress the rubber member such as the rim cushion rubber 60 located between the 5°-taper specified rim R and the bead core 21 over a predetermined range in the tire width direction, to exert the appropriate fastening force on the specified rim R.

Additionally, the bead portion 20 has the bead base portion 30 that comes into actual contact with the specified rim R and formed with a curved line projecting toward the inner side in the tire radial direction in the tire meridian cross-section, thus allowing the appropriate fastening force to be ensured without degrading mountability on rims. In other words, since the bead base portion 30 is formed with the curved line projecting toward the inner side in the tire radial direction, the diameter of the inner circumferential surface of the bead portions 20 can be increased from a position on the bead base portion 30 closer to the heel portion 35 toward the heel portion 35 side. Thus, the fastening force of the heel portion 35 can be reduced, and possible frictional resistance between the heel portion 35 and the rim wheel can be reduced in a case where the pneumatic tire 1 is mounted on the rim wheel. Accordingly, the mountability on rims can be improved.

Additionally, the bead base portion 30 is formed in a shape projecting toward the inner side in the tire radial direction, enabling a reduction in the diameter of the inner circumferential surface of the bead portion 20 at a position on the inner side of the bead core 21 in the tire radial direction. This enables an increase in the amount of rubber member compressed at a position on the inner side of the bead core 21 in the tire radial direction, allowing the fastening force on the specified rim R by the bead portion 20 to be ensured.

Furthermore, in a case where the bead base portion 30 is formed in a shape projecting toward the inner side in the tire radial direction, the bead base portion 30 is shaped like a curved line in the tire meridian cross-section. Thus, the diameter of the inner circumferential surface of the bead portion 20 can be reduced over a wide range in the tire width direction at a position on the inner side of the bead core 21 in the tire radial direction, and the amount of rubber member compressed can be increased over a wide range in the tire width direction. Thus, the bead portion 20 can suppress a local increase in contact pressure on the specified rim R equipped with the pneumatic tire 1, and the fastening force can be ensured over a wide range in the tire width direction. Accordingly, damage to the bead portion 20 caused by a local increase in contact pressure on the specified rim R can be suppressed. As a result, rim slippage can be suppressed with mountability on rims and bead durability are ensured.

Additionally, the range between the core lower inner end portion position O and the core lower outer end portion position Q of the bead base portion 30 is formed into a curved line projecting toward the inner side in the tire radial direction in the tire meridian cross-section, and thus rim slippage can be suppressed with mountability on rims and bead durability more reliably prevented from being degraded. In other words, within the range between the core lower inner end portion position O and the core lower outer end portion position Q of the bead base portion 30, all the portions are formed into curved lines projecting toward the inner side in the tire radial direction instead of projecting toward the outer side in the tire radial direction in the tire meridian cross-section. Thus, at a position closer to the core lower outer end portion position Q, the amount of projection toward the inner side in the tire radial direction can be more reliably reduced, and in a region from a position on the bead base portion 30 closer to the core lower outer end portion position Q to the heel portion 35, the diameter of the inner circumferential surface of the bead portion 20 can be more reliably increased. Thus, in the region from the position on the bead base portion 30 closer to the core lower outer end portion position Q to the heel portion 35, the fastening force on the specified rim R can be more reliably reduced, decreasing frictional resistance during mounting onto the rim to allow mountability on rims to be improved.

Additionally, within the range between the core lower inner end portion position O and the core lower outer end portion position Q, no portions of the bead base portion 30 project toward the outer side in the tire radial direction, and thus the amount of rubber member in this range can be more reliably increased, allowing the fastening force on the specified rim R at the position of the bead base portion 30 to be more reliably improved. Additionally, within the range between the core lower inner end portion position O and the core lower outer end portion position Q, all the portions of the bead base portion 30 are formed into curved lines projecting toward the inner side in the tire radial direction without projecting toward the outer side in the tire radial direction, enabling the amount of rubber member compressed to be increased over a wide range. This allows the contact pressure on the specified rim R to be more reliably dispersed. Thus, a local increase in contact pressure on the specified rim R can be more reliably suppressed, and damage to the bead portion 20 can be more reliably suppressed. As a result, rim slippage can be suppressed with mountability on rims and bead durability more reliably ensured.

Additionally, the toe portion 32 includes the inclined portion 33 and the inner end portion 34 that are each linear in the tire meridian cross section, and projects toward the inner side in tire radial direction from the bead base portion 30 in the tire radial direction, thus allowing improvement of adhesive properties of the portion of the bead portion 20 contacting the specified rim R, to the specified rim R at or near the inner end portion in the tire width direction. As a result, hermeticity can be improved during inflation.

Additionally, in the bead base portion 30, the position of the outermost projection portion S in the tire width direction is located between the position of the bead core bottom center 24 in the tire width direction and the position of the outer end portion 23o of the bead core bottom 23 in the tire width direction, thus allowing bead durability to be more reliably improved, while enabling rim slippage to be suppressed. In other words, the fastening force on the specified rim R by the bead portion 20 is likely to be strongest at those of the positions on the bead base portion 30 in the tire width direction which are close to the outer end portion 23o of the bead core bottom 23 because the angle A1 of the bead core bottom 23 with respect to the 5°-taper specified rim R is within the range of 0° or larger and 5° or smaller.

In contrast, in the present embodiment, the position of the outermost projection portion S of the bead base portion 30 in the tire width direction is located between the position of the bead core bottom center 24 and the position of the outer end portion 23o of the bead core bottom 23, thus enabling an increase in the amount of rubber member located on the inner side in the tire width direction of the outer end portion 23o of the bead core bottom 23. Accordingly, the fastening force at the position on the inner side in the tire width direction of the outer end portion 23o of the bead core bottom 23 can be more reliably increased, allowing the contact pressure on the specified rim R to be more reliably dispersed. Additionally, the amount of rubber member at the position on the inner side in the tire width direction of the outer end portion 23o of the bead core bottom 23 increases to allow the fastening force on the specified rim R by the entire bead base portion 30 to be improved. As a result, bead durability can be more reliably improved, and rim slippage can be suppressed.

Additionally, the bead portion 20 includes, within the range between the connection portion 47 of the heel portion 35 connected to the back surface portion 40 and the core lower outer end portion position Q, the portion where the relationship between the diameter Dn of the inner circumferential surface of the bead portion 20 and the diameter DnR of the specified rim R for which the position in the tire width direction is identical is, in a case where (DnR−Dn)/DnR×100 is calculated, 0%, and thus the fastening force on the specified rim R by the heel portion 35 can be reduced. This allows the bead portion 20 to be more appropriately seated on the specified rim R during mounting. As a result, mountability on rims can be more reliably improved.

Additionally, for the bead base portion 30, {(rim diameter DPR−tire inner diameter DP)/rim diameter DPR×100} at the core bottom outer end portion lower position P is at least 0.2% larger than {(rim diameter DQR−tire inner diameter DQ)/rim diameter DQR×100} at the core lower outer end portion position Q, thus the fastening force on the specified rim R at a position on the inner side of the bead core bottom 23 in the tire radial direction can be ensured, with the fastening force on the specified rim R at a position closer to the heel portion 35 reduced. As a result, rim slippage can be suppressed with mountability on rims more reliably ensured.

Additionally, in the bead portion 20, with the pneumatic tire 1 mounted on the specified rim R, the compression ratio Z of the rubber located on the inner side of the bead core 21 in the tire radial direction is within the range of 45% or more and 55% or less at a position on the inner side of the bead core bottom center 24 in the tire radial direction in the tire meridian cross-section. This allows more reliable, compatible provision of both durability of the bead base portion 30 and the fastening force of the bead base portion 30. In other words, in a case where the compression ratio Z is less than 45%, the compression ratio Z is excessively low and may make ensuring the fastening force of the bead portion 20 difficult. This may lead to difficulty in effectively suppressing slippage between the bead base portion 30 located on the inner side of the bead core 21 in the tire radial direction and the rim wheel. Additionally, in a case where the compression ratio Z exceeds 55%, the compression ratio Z is excessively high and may cause the rim cushion rubber 60 located on the inner side of the bead core 21 in the tire radial direction to be excessively deformed, making the fastening force of the bead base portion 30 likely to be increased. In this case, the contact pressure on the specified rim R may be excessively high, and the excessive contact pressure may make the bead base portion 30 susceptible to damage.

In contrast, in a case where the compression ratio Z is within the range of 45% or more and 55% or less, the fastening force on the specified rim R by the bead base portion 30 can be ensured, with damage to the bead base portion 30 caused by the excessively high compression ratio Z suppressed. As a result, bead durability can be more reliably improved, and rim slippage can be suppressed.

In addition, in the bead portion 20, the position in the tire radial direction of the connection portion 47 where the arc portion 37 of the heel portion 35 is connected to the back surface portion 40 is within the range in the tire radial direction between the position in the tire radial direction of the maximum width CW portion of the bead core 21 and the position of the bead core bottom 23 in the tire radial direction. This allows more reliable, compatible achievement of both a reduction in frictional resistance between the heel portion 35 and the rim wheel and exertion of the fastening force of the heel portion 35. In other words, in a case where the position of the connection portion 47 in the tire radial direction is located on the outer side of the tire radial direction position of the maximum width CW portion of the bead core 21 in the tire radial direction, the arc portion 37 is located on an excessively outer side in the tire radial direction. Thus, in a case where the pneumatic tire 1 is mounted on the rim wheel, the compression ratio of the rubber located in the heel portion 35 may be excessively low. In this case, the fastening force generated in the heel portion 35 is less likely to be ensured, and the fastening force of the bead portion 20 as a whole may be reduced. Additionally, in a case where the position of the connection portion 47 in the tire radial direction is located on the inner side of the tire radial direction position of the bead core bottom 23 in the tire radial direction, the arc portion 37 is located on an excessively inner side in the tire radial direction. Thus, even in a case where the arc portion 37 is provided in the heel portion 35, the compression ratio of the rubber located in the heel portion 35 may be difficult to reduce in a case where the pneumatic tire 1 is mounted on the rim wheel. In this case, effectively reducing the fastening force of the heel portion 35 is difficult, and thus effectively reducing the frictional resistance may be difficult in a case where the pneumatic tire 1 is mounted on the rim wheel, and improving mountability on rims may be difficult.

In contrast, the position in the tire radial direction of the connection portion 47 is within the range in the tire radial direction between the position in the tire radial direction of the maximum width CW portion of the bead core 21 and the position of the bead core bottom 23 in the tire radial direction. Thus, the fastening force on the specified rim R by the heel portion 35 can be ensured, with the frictional resistance between the heel portion 35 and the rim wheel more reliably reduced. As a result, rim slippage can be suppressed with mountability on rims more reliably ensured.

Additionally, in the bead portion 20, the position in the tire width direction of the toe side bent portion 45 connecting the bead base portion 30 and the toe portion 32 is located on the inner side in the tire width direction of the tire width direction position of the core lower inner end portion position O. Thus, the width of the bead base portion 30 in the tire meridian cross-section can be more reliably ensured. Thus, in a case where the pneumatic tire 1 is mounted on the specified rim R, the range in which the rubber member such as the rim cushion rubber 60 can be effectively compressed by the bead core bottom 23 can be more reliably ensured, and the fastening force of the bead base portion 30 can be more reliably ensured. As a result, rim slippage can be more reliably suppressed.

Additionally, in the bead portion 20, the maximum width CW of the bead core 21 with respect to the bead width BW in the tire meridian cross-section is within the range of $(BW \times 0.54) \leq CW \leq (BW \times 0.58)$, and thus mountability on rims can be more reliably ensured, and damage to the bead portion 20 can be more reliably suppressed. In addition, slippage between bead portions 20 and rim wheels can be suppressed. In other words, in a case where the maximum width CW of the bead core 21 with respect to the bead width BW is $CW < (BW \times 0.54)$, the maximum width CW of the bead core 21 is excessively small. Thus, in a case where the pneumatic tire 1 is mounted on the rim wheel, the fastening force of the bead base portion 30 located on the inner side of the bead core 21 in the tire radial direction may be locally increased, that is, suppressing a local increase in contact pressure of the bead base portion 30 on the specified rim R may be difficult. In this case, suppressing damage to the bead portion 20 caused by a local increase in contact pressure may be difficult. Additionally, in a case where the fastening force of the bead base portion 30 is locally increased, the frictional resistance is also partially increased in a case where the pneumatic tire 1 is mounted on the rim. This makes achievement of mountability on rims difficult and is likely to produce portions with a reduced fastening force. Accordingly, effectively suppressing slipping between the bead portion 20 and the rim wheel may be difficult. Additionally, in a case where the maximum width CW of the bead core 21 with respect to the bead width BW is $CW > (BW \times 0.58)$, the bead core 21 has an excessively large maximum width CW. Accordingly, excessively significant distortion may occur around the bead core 21 in a case where a heavy load is applied to the bead portion 20. In this case, the significant distortion may cause separation between the bead core 21 and the rubber member surrounding the bead core 21 or between the member such as the carcass 6 or the steel chafer 55 located around the bead core 21 and the surrounding rubber member.

In contrast, in a case where the maximum width CW of bead core 21 with respect to the bead width BW is within the range of $(BW \times 0.54) \leq CW \leq (BW \times 0.58)$, a local increase in the fastening force of bead base 30 can be suppressed. In addition, the fastening force on the specified rim R by the bead base portion 30 can be generated over a wide range enough to suppress excessively significant distortion occurring around the bead core 21. Thus, a partial increase in frictional resistance during mounting can be suppressed, and slippage between the bead portion 20 and the rim wheel can be more reliably suppressed. Additionally, damage to the bead portions 20 caused by an excessive local increase in contact pressure can be more reliably suppressed. Furthermore, separation of the members around the bead core 21 can be suppressed. As a result, rim slippage can be suppressed with mountability on rims and bead durability more reliably ensured.

Additionally, in the bead portion 20, the bead width BW with respect to the specified load x kN is within the range of $(0.265x+20.5)$ mm $\leq BW \leq (0.265x+26.5)$ mm, and thus both degradation of mountability on rims and separation of the members around the bead core 21 can be suppressed. In other words, in a case where the bead width BW with respect to the specified load x kN is $BW \leq (0.265x+20.5)$ mm, the bead width BW may be excessively small with respect to the specified load x kN. This may lead to excessively high stress of the member included in the bead portion 20 in a case where a heavy load is applied. In this case, in a case where a heavy load is applied, excessively significant distortion may occur around the bead core 21 and separation may be likely to occur in the members around the bead core 21. Additionally, in a case where the bead width BW with respect to the specified load x kN is $BW \leq (0.265x+26.5)$ mm, the bead width BW may be excessively large, and the bead portion 20 may exert a fastening force on the specified rim R over an excessively wide range. This leads to an increase in the magnitude of the overall fastening force, and thus in a case where the pneumatic tire 1 is mounted on the rim wheel, the mounting may be difficult.

In contrast, in a case where the bead width BW with respect to the specified load x kN is within the range of $(0.265x+20.5)$ mm $\leq BW \leq (0.265x+26.5)$ mm, The size of the bead width BW can be such that the range of generation of a fastening force is not excessively wide and that the distortion occurring around the bead core 21 is not excessively significant. This allows suppression of both reduction in mountability on rims and separation of the members around the bead core 21. As a result, bead durability can be improved with mountability on rims more reliably ensured.

Additionally, in the bead core 21, the relationship between the maximum width CW and the height CH in the tire radial direction in the tire meridian cross-section is represented by the range of $1.0 \leq (CW/CH) < 1.5$, and thus mountability on rims can be more reliably ensured, and damage to the bead portion 20 can be more reliably suppressed. Additionally, slippage between the bead portion 20 and the rim wheel can be suppressed. In other words, in a case where the relationship between the maximum width CW and the height CH of the bead core 21 is represented by $(CW/CH) < 1.0$, the maximum width CW of the bead core 21 is excessively small, and thus the contact pressure on the specified rim R by the bead base portion 30 may be locally increased in a case where the pneumatic tire 1 is mounted on the rim R. In this case, the frictional resistance is partially increased in a case where the pneumatic tire 1 is mounted on the rim, ensuring mountability on rims may be difficult, and suppressing damage to the bead portion 20 may be difficult, the damage being caused by an excessive local increase in contact pressure. Additionally, in a case where the contact pressure on the specified rim R by the bead base portion 30 is locally increased, portions with a reduced fastening force are likely to be produced, and thus effectively suppressing slippage between the bead portion 20 and the rim wheel may also be difficult. Additionally, in a case where the relationship between the maximum width CW and the height CH of the bead core 21 is $(CW/CH) \geq 1.5$, the bead core 21 has an excessively large maximum width CW, and thus excessively significant distortion may occur around the bead core 21 in a case where a heavy load is applied. In this case, the significant distortion may make separation likely to occur in the members around the bead core 21.

In contrast, in a case where the relationship between the maximum width CW and the height CH of the bead core 21 is represented by the range of $1.0 \leq (CW/CH) < 1.5$, a local increase in the fastening force of bead base 30 can be suppressed, and the fastening force on the specified rim R by the bead base portion 30 can be generated over a wide range enough to suppress excessively significant distortion occurring around the bead core 21. Thus, a partial increase in frictional resistance during mounting can be suppressed, and slippage between the bead portion 20 and the rim wheel can be more reliably suppressed. Additionally, damage to the bead portions 20 caused by an excessive local increase in contact pressure can be more reliably suppressed. Furthermore, separation of the members around the bead core 21 can be suppressed. As a result, rim slippage can be suppressed with mountability on rims and bead durability more reliably ensured.

In addition, in the bead portion 20, the distance BD1 in the tire radial direction from the bead core bottom center 24 to the surface of the carcass cord 6a of the portion of the carcass 6 located on the inner side of the bead core 21 in the tire radial direction in the tire meridian cross-section is within the range of 2.0 mm or longer and 3.5 mm or shorter, and thus the fastening force of the bead portion 20 can be more reliably ensured, with the likelihood of damage to the reinforcing layer suppressed. In other words, in a case where the distance BD1 in the tire radial direction from the bead core bottom center 24 to the surface of the carcass cords 6a is shorter than 2.0 mm, the thickness Ga1 of the rubber member located between the bead core 21 and the carcass cord 6a in the portion located on the inner side of the bead core 21 in the tire radial direction is excessively small. Thus, the member compressed in a case where the pneumatic tire 1 is mounted on the rim wheel is thinner, and ensuring the fastening force of the bead portion 20 may be difficult. In this case, effectively suppressing slippage between the bead portion 20 and the rim wheel may be difficult. Additionally, in a case where the distance BD1 in the tire radial direction from the bead core bottom center 24 to the surface of the carcass cords 6a exceeds 3.5 mm, the thickness Ga1 of the rubber member located between the bead core 21 and the carcass cord 6a in the portion located on the inner side of the bead core 21 in the tire radial direction is excessively large. Accordingly, the thickness of the rim cushion rubber 60 in the portion located on the inner side of the bead core 21 in the tire radial direction may be excessively small. In other words, the thickness of the rim cushion rubber 60 located on the inner side of the steel chafer 55 in the tire radial direction may be excessively small. In this case, in a case where rim slippage occurs to wear the rim cushion rubber 60, the reinforcing layer such as the steel chafer 55 is likely to be exposed and may be likely to be damaged.

In contrast, in a case where the distance BD1 in the tire radial direction from the bead core bottom center 24 to the surface of the carcass cords 6*a* is within the range of 2.0 mm or longer and 3.5 mm or shorter, the thickness of each of the rubber members on both sides in the tire radial direction of the portion of the reinforcing layer such as the carcass 6 located on the inner side of the bead core 21 in the tire radial direction can be set to a suitable value. Thus, the fastening force of the bead portion 20 can be more reliably ensured, with the likelihood of damage to the reinforcing layer suppressed. As a result, rim slippage can be suppressed, with bead durability more reliably ensured.

MODIFIED EXAMPLES

Note that in the pneumatic tire 1 according to the embodiment described above, the bead base portion 30 includes a curved line projecting toward the inner side in the tire radial direction over the entire range between the core lower inner end portion position O and the core lower outer end portion position Q in the tire meridian cross section. However, the bead base portion 30 may be formed in a shape other than the shape projecting toward the inner side in the tire radial direction over the entire range between the core lower inner end portion position O and the core lower outer end portion position Q. The bead base portion 30 may be formed, in a shape projecting toward the outer side in the tire radial direction in a part of the region between the core lower inner end portion position O and the core lower outer end portion position Q, for example, the bead base portion 30 may be formed in a gentle S shape, a wavy shape, or the like in the tire meridian cross section.

Additionally, in the pneumatic tire 1 according to the embodiment described above, the intermediate portion 36 of the heel portion 35 includes a curved line extending continuously from the bead base portion 30 and projecting toward the inner side in the tire radial direction in the tire meridian cross-section. However, the intermediate portion 36 of the heel portion 35 may be formed in a shape extending continuously from the bead base portion 30. In the tire meridian cross-section, the intermediate portion 36 of the heel portion 35 may include a curved line having a curvature different from that of the bead base portion 30, for example, or may be formed in a straight line shape joining the arc portion 37 of the heel portion 35 and the bead base portion 30.

Additionally, in the pneumatic tire 1 according to the embodiment described above, the bead portion 20 includes one carcass 6 as a reinforcing layer, and the three chafers of the steel chafer 55 and the sub-chafers 56 and 57. However, the reinforcing layer may have a different configuration. For example, two or more carcasses 6 may be disposed, or two or less chafers may be provided or the chafers may be omitted.

EXAMPLES

FIGS. 6A to 6C are a table indicating the results of performance tests of pneumatic tires. In relation to the pneumatic tire 1 described above, performance evaluation tests conducted on a pneumatic tire according to a conventional example, the pneumatic tire 1 according to an embodiment of the present technology, and a pneumatic tire according to a comparative example to be compared with the pneumatic tire 1 according to the embodiment of the present technology will be described below. The performance evaluation tests were conducted on rim slip resistance indicating performance against rim slippage, mountability on rims indicating the easiness of mounting on the rim, and bead durability indicating durability of the bead portion 20.

In the performance evaluation tests, the pneumatic tire 1 having a tire nominal of 29.5R25 size and a TRA cord of L-3 was used as a test tire. The test tire is mounted on a rim wheel conforming to the TRA standard, the air pressure is adjusted to an air pressure defined in the TRA standard, and the tire is mounted on a wheel loader used as a test vehicle. Test runs are conducted with the tire subjected to a load specified by the TRA standard.

In the evaluation method for each of the test items, for rim slip resistance, a mark is applied to each of the test tire and the rim wheel before the test run with the test vehicle, and the amount of displacement between the test tire and the rim wheel in the tire circumferential direction is measured after a 24-hour run for evaluation. The rim slip resistance is expressed as an index value with the conventional example described below being assigned the value of 100. Larger values indicate less likelihood of displacement between the test tire and the rim wheel in the tire circumferential direction and superior rim slip resistance.

Additionally, for mountability on rims, an operator measures the time required to mount the test tire on the rim wheel conforming to the TRA standard with no eccentric fitting and inflates the tire to a certain internal pressure. The reciprocal of the measured time is expressed as an index value with the conventional example described below being assigned the value of 100. Larger index values indicate shorter required time and superior mountability on rims. Note that the presence of eccentric fitting is checked by visual inspection with the rim check line 9.

Additionally, the bead durability is evaluated by removing the test tire from the rim wheel after traveling for 2000 hours in the test vehicle, and checking for damage to the bead base portion 30 and the occurrence of separation at the bead portion 20. The bead durability is expressed as an index value with Conventional Example described below being assigned the value of 100. Larger values indicate superior bead durability with no damage to the bead base portion 30 or separation at the bead portion 20.

The performance evaluation test is performed on 18 types of pneumatic tires including a conventional pneumatic tire corresponding to a pneumatic tire according to Conventional Example, Examples 1 to 16 including the pneumatic tire 1 according to an embodiment of the present technology, and Comparative Example including a pneumatic tire compared with the pneumatic tire 1 according to the embodiment of the present technology. Of these pneumatic tires, the pneumatic tires according to Conventional Example and Comparative Example include the bead base portion 30 not formed into a curved line projecting toward the inner side in the tire radial direction but shaped like a flat straight line in a meridian cross section.

In contrast, in all of Examples 1 to 16, as examples of the pneumatic tire 1 according to an embodiment of the present technology, the bead base portion 30 is formed in a curved line shape projecting toward the inner side in the tire radial direction in the tire meridian cross section. Furthermore, the pneumatic tires 1 according to Examples 1 to 16 vary in the presence/absence, within the range between the back surface portion 40 and the core lower outer end portion position Q, of a portion where {(rim diameter−tire inner diameter)/rim diameter×100} is 0%, a difference in {(rim diameter−tire inner diameter)/rim diameter×100} between the core lower outer end portion position Q and the core bottom outer end portion lower position P, {(DPR−DP)/DPR×100} at the core bottom outer end portion lower position P, {(DQR−DQ)/DQR×100} at the core lower outer end portion position Q, the compression ratio Z of the rubber located on the inner side of the bead core 21 in the tire radial direction, whether the position in the tire radial direction of the connection portion 47 connecting the arc portion 37 of the heel portion 35 to the back surface portion 40 is located within the range between the position of the maximum width CW of the bead core 21 and the position of the bead core bottom 23, the position in the tire width direction of the toe side bent portion 45 connecting the bead base portion 30 and the toe portion 32, with respect to the bead core inner end portion 26, the maximum width CW of the bead core 21 with respect to the bead width BW, the bead width BW, the maximum width CW of the bead core 21/the height CH of the bead cores 21, and the distance BD1 from the bead core bottom center 24 to the surface of the carcass cords 6a.

Note that the specified load x on the test tires used in the performance evaluation tests is 176.52 kN, and the bead width BW calculated by applying the specified load x to a relationship formula (0.265x+20.5) mm≤BW≤(0.265x+26.5) mm is within the range of 67.2 mm or longer and 71.2 mm or shorter.

As a result of the performance evaluation tests using the pneumatic tires 1, as indicated in FIGS. 6A to 6C, the pneumatic tires 1 according to Examples 1 to 16 are found to enable the rim slip resistance to be improved without degrading mountability on rims or bead durability compared to Conventional Example and Comparative Example. In other words, the pneumatic tires 1 according to Examples 1 to 16 can suppress the rim slippage with the mountability on rims and bead durability ensured.

The invention claimed is:
1. A pneumatic tire, comprising:
a pair of bead portions disposed on both sides of a tire equatorial plane in a tire width direction; and
a bead core provided on each of the pair of bead portions, the pneumatic tire being mounted on a 5°-taper specified rim,
the bead core has a hexagon shape in a tire meridian cross-section and includes a bead core bottom corresponding to an inner circumferential surface of the bead core and inclined within a range of 0° or larger and 5° or smaller with respect to a tire rotation axis in a direction in which the bead core bottom diverges outward in a tire radial direction as the bead core extends from an inner side in a tire width direction toward an outer side in the tire width direction,
the bead portion comprising a bead base portion formed on an inner circumferential surface of the bead portion, a toe portion located on an inner side of the bead base portion in the tire width direction, a heel portion located on an outer side of the bead base portion in the tire width direction, and a back surface portion located on an outer side of the heel portion in the tire radial direction and facing an outer side in the tire width direction,
the heel portion being connected to the back surface portion through an arc portion formed like an arc in the tire meridian cross-section,
the bead base portion comprising a region between a core lower inner end portion position located on an inner circumferential surface and being identical to a position in the tire width direction of a tire width direction inner end portion of the bead core and a core lower outer end portion position where the position located on an inner circumferential surface and being identical to a position in the tire width direction of a tire width direction outer end portion of the bead core, and
the bead base portion having a curved line projecting toward an inner side in the tire radial direction in the tire meridian cross-section; wherein
the curved line extends continuously from the core lower inner end portion position to the core lower outer end portion position in the bead base portion; and
assuming that, for the bead base portion, DP is a diameter at a core bottom outer end portion position where the position in the tire width direction is identical to the position in the tire width direction of the tire width direction outer end portion of the bead core bottom, DQ is a diameter at the core lower outer end portion position, DPR is a diameter at a position on the specified rim corresponding to the core bottom outer end portion lower position, and DQR is a diameter at a position on the specified rim corresponding to the core lower outer end portion position, (DPR−DP)/DPR×100 is at least 0.2% larger than (DQR−DQ)/DQR×100.

2. The pneumatic tire according to claim 1, wherein the toe portion includes a straight line in the tire meridian cross-section and projects toward the inner side of the bead base portion in the tire radial direction.

3. The pneumatic tire according to claim 1, wherein in the bead base portion, a position in the tire width direction of an outermost projection portion separated farthest from a straight line connecting the core lower inner end portion position and the core lower outer end portion position in the tire meridian cross-section is located between a position in the tire width direction of a center of the bead core bottom in the tire width direction and a position in the tire width direction of a tire width direction outer end portion of the bead core bottom.

4. The pneumatic tire according to claim 1, wherein the bead portion includes, within a range between a position of the heel portion connected to the back surface portion and the core lower outer end portion position, a portion in which a relationship between a diameter Dn of the inner circumferential surface of the bead portion and a diameter DnR of the specified rim, both being in an identical position in the tire width direction, is represented to be 0% by a calculation (DnR−Dn)/DnR×100.

5. The pneumatic tire according to claim 1, wherein in a case where the pneumatic tire is mounted on the specified rim, a compression ratio of rubber located on an inner side of the bead core in the tire radial direction is within a range of 45% or more and 55% or less at a position on an inner side, in the tire radial direction, of the center of the bead core bottom in the tire meridian cross-section.

6. The pneumatic tire according to claim 1, wherein a connection portion corresponding to a portion where the arc portion and the back surface portion are connected is located within a range in the tire radial direction between a position in the tire radial direction corresponding to a maximum width portion of the bead core in the meridian cross-section and the position of the bead core bottom in the tire radial direction.

7. The pneumatic tire according to claim 1, wherein
the toe portion projects toward the inner side of the bead base portion in the tire radial direction,
the bead base portion and the toe portion are connected through a toe side bent portion bent toward the outer side in the tire radial direction, and
a position of the toe side bent portion in the tire width direction is located on an inner side of the core lower inner end portion position in the tire width direction.

8. The pneumatic tire according to claim 1, wherein assuming that BW is a distance between a tire inner surface and a tire outer surface on a straight line parallel to a straight line extending through a center of the bead core in the tire meridian cross-section and connecting the core lower inner end portion position and the core lower outer end portion position, the bead core has a maximum width CW in the tire meridian cross-section in a range of $(BW \times 0.54) \leq CW \leq (BW \times 0.58)$.

9. The pneumatic tire according to claim 8, wherein the bead width BW is within a range of $(0.265x+20.5)$ mm $\leq BW \leq (0.265x+26.5)$ mm with respect to a specified load x kN.

10. The pneumatic tire according to claim 1, wherein the bead core preferably has a relationship between a maximum width CW in the tire meridian cross-section and a height CH in the tire radial direction, the relationship being within a range of $1.0 \leq (CW/CH) < 1.5$.

11. The pneumatic tire according to claim 1, further comprising a reinforcing layer disposed extending through the inner side of the bead core in the tire radial direction of the bead core and between the inner side and the outer side of the bead core in the tire width direction of the bead core, wherein the reinforcing layer includes a cord member covered with a rubber member, and the bead portion has a distance of 2.0 mm or more and 3.5 mm or less in the tire radial direction from a center of the bead core bottom in a tire meridian cross section to a surface of the cord member of a portion of the bead core of the reinforcing layer located on an inner side in the tire radial direction.

* * * * *